(12) United States Patent
Nishino et al.

(10) Patent No.: US 9,959,836 B2
(45) Date of Patent: May 1, 2018

(54) IMAGE OUTPUT APPARATUS, OPERATION METHOD FOR AN IMAGE OUTPUT APPARATUS, ELECTRONIC CIRCUIT, ELECTRONIC APPARATUS, AND PROGRAM

(71) Applicant: Sony Corporation, Tokyo (JP)

(72) Inventors: Tatsuki Nishino, Kanagawa (JP); Susumu Seino, Kanagawa (JP)

(73) Assignee: Sony Corporation, Tokyo (JP)

( * ) Notice: Subject to any disclaimer, the term of this patent is extended or adjusted under 35 U.S.C. 154(b) by 70 days.

(21) Appl. No.: 14/063,642

(22) Filed: Oct. 25, 2013

(65) Prior Publication Data

US 2014/0125715 A1 May 8, 2014

(30) Foreign Application Priority Data

Nov. 2, 2012 (JP) ................. 2012-242413

(51) Int. Cl.
```
G09G 5/10      (2006.01)
G09G 3/02      (2006.01)
H04N 9/31      (2006.01)
G03B 21/20     (2006.01)
```
(52) U.S. Cl.
CPC ............. *G09G 5/10* (2013.01); *G09G 3/025* (2013.01); *H04N 9/3135* (2013.01); *H04N 9/3155* (2013.01); *G03B 21/2033* (2013.01); *G03B 21/2053* (2013.01); *G09G 2320/041* (2013.01); *G09G 2320/0693* (2013.01); *G09G 2330/02* (2013.01); *G09G 2330/021* (2013.01); *G09G 2330/12* (2013.01); *G09G 2360/16* (2013.01)

(58) Field of Classification Search
CPC .............. G09G 5/10; G09G 2320/041; G09G 2320/0693; G09G 2330/02; G09G 2330/021; G09G 2330/12; G09G 2360/16; G03B 21/00; H04N 9/3135; H04N 9/3155
See application file for complete search history.

(56) References Cited

U.S. PATENT DOCUMENTS

| | | | |
|---|---|---|---|
| 2003/0058373 A1* | 3/2003 | Roest ................... | H04N 5/7441 349/5 |
| 2007/0222740 A1* | 9/2007 | Hanada ................ | G09G 3/3406 345/102 |
| 2007/0279390 A1* | 12/2007 | Loukianov ................ | G01J 3/50 345/169 |
| 2009/0153063 A1* | 6/2009 | Sudo ............................ | 315/158 |
| 2010/0074283 A1* | 3/2010 | Ikegami .................. | H01S 5/042 372/24 |

(Continued)

FOREIGN PATENT DOCUMENTS

JP      2012-069857       4/2012

*Primary Examiner* — Mark Regn
(74) *Attorney, Agent, or Firm* — Michael Best & Friedrich LLP

(57) ABSTRACT

An image output apparatus includes a light emitting unit, a power supplying unit, and a control unit. The light emitting unit is configured to emit a laser beam. The power supplying unit is configured to supply power to the light emitting unit at a predetermined voltage. The control unit is configured to control the power supplying unit to supply the power to the light emitting unit in a predetermined period at the voltage associated with a peak light emission amount of the light emitting unit in image data for the predetermined period.

20 Claims, 18 Drawing Sheets

(56) References Cited

U.S. PATENT DOCUMENTS

2012/0182332 A1* 7/2012 Liu ................... G09G 3/2007
 345/691
2013/0083087 A1* 4/2013 Byun .................. G09G 3/3233
 345/690
2013/0335390 A1* 12/2013 Ishibashi et al. ............. 345/207

* cited by examiner

IMAGE OUTPUT APPARATUS, OPERATION METHOD FOR AN IMAGE OUTPUT APPARATUS, ELECTRONIC CIRCUIT, ELECTRONIC APPARATUS, AND PROGRAM

CROSS REFERENCE TO RELATED APPLICATIONS

This application claims the benefit of Japanese Priority Patent Application JP 2012-242413 filed Nov. 2, 2012, the entire contents of which are incorporated herein by reference.

BACKGROUND

The present technology relates to an image output apparatus, an operation method for an image output apparatus, an electronic circuit, an electronic apparatus, and a program, and more particularly to an image output apparatus, an operation method for an image output apparatus, an electronic circuit, an electronic apparatus, and a program which are capable of reducing power consumption of a projection apparatus.

A projection type display apparatus which projects and displays an image using a compact laser light source called a pico projection apparatus has been proposed.

To realize this pico projection apparatus, various light sources have been proposed (for example, see Japanese Patent Application Laid-Open No. 2012-069857).

SUMMARY

On the other hand, the pico projection apparatus has a compact apparatus configuration itself in most cases. Therefore, it is also difficult to adopt a large power source which supplies power necessary for the operation. In particular, when the pico projection apparatus is mounted on a mobile apparatus, the capacity of the power source is limited, such that it is necessary to reduce power consumption of the pico projection apparatus.

Moreover, a light source having a relatively large amount of light is necessary to realize the pico projection apparatus. Therefore, as light is emitted, an amount of heat generation increases, such that the size of the apparatus becomes large and the power consumption thereof is increased by adding a heat dissipating apparatus such as a fan to the configuration.

Further, the amount of light of the light source necessary for the pico projection apparatus varies according to the image. However, a voltage applied to the light source according to the image is set according to the maximum light emission amount which is necessary to the entire image. Therefore, an output voltage equal to or higher than the light emission amount that is inherently necessary is applied, such that power is wastefully consumed.

The present technology has been made in view of the above-described circumstances such that particularly when the projection type display apparatus causes the light source to emit light, a peak light emission amount is calculated every predetermined period such as a frame unit and the output voltage is set according to the peak light emission amount, thereby suppressing application of the light source due to a excessive voltage and reducing the power consumption in the light source.

According to a first embodiment of the present technology, there is provided an image output apparatus including: a light emitting unit configured to emit a laser beam; a power supplying unit configured to supply power to the light emitting unit at a predetermined voltage; and a control unit configured to control the power supplying unit to supply the power to the light emitting unit in a predetermined period at the voltage associated with a peak light emission amount of the light emitting unit in image data for the predetermined period.

The image output apparatus may further include: a light emission amount measuring unit configured to measure the light emission amount emitted by the light emitting unit; and an adjustment storage unit configured to store the light emission amount measured by the light emission amount measuring unit in association with each voltage of the power supplied to the light emitting unit when the control unit controls the power supplying unit to supply the power to the light emitting unit while varying the voltage of the power supplied to the light emitting unit, in which the control unit may be configured to control the power supplying unit to read in the image data for the predetermined period and supply the power to the light emitting unit in the predetermined period at the voltage associated with the peak light emission amount of the read-in image data for the predetermined period among the light emission amounts stored in the adjustment storage unit.

The adjustment storage unit may be configured to store the light emission amount measured by the light emission amount measuring unit in association with each voltage of the power supplied to the light emitting unit when the control unit controls the power supplying unit to supply the power to the light emitting unit while varying the voltage of the power supplied to the light emitting unit at a predetermined voltage interval from a lowest voltage up to a highest voltage at a startup time.

The adjustment storage unit may be configured to repeatedly store the light emission amount measured by the light emission amount measuring unit in association with each voltage of the power supplied to the light emitting unit when the control unit repeatedly controls the power supplying unit to supply the power to the light emitting unit while varying the voltage of the power supplied to the light emitting unit at the predetermined voltage interval from a lowest voltage up to a highest voltage at a predetermined time interval, and the control unit may be configured to control the power supplying unit to read in the image data for the predetermined period and supply the power to the light emitting unit in the predetermined period at the voltage most recently stored associated with the peak light emission amount of the read-in image data for the predetermined period among the light emission amounts stored in the adjustment storage unit.

The image output apparatus may further include: a light emission amount measuring unit configured to measure the light emission amount emitted by the light emitting unit; an output voltage measuring unit configured to measure an output voltage of the light emitting unit; and an adjustment storage unit configured to store the light emission amount measured by the light emission amount measuring unit in association with each output voltage of output power measured by the output voltage measuring unit when the control unit controls the power supplying unit to supply the power to the light emitting unit while varying the voltage of the power supplied to the light emitting unit such that the output voltage measured by the output voltage measuring unit varies, in which the control unit may be configured to control the power supplying unit to read in the image data for the predetermined period and supply the power to the light emitting unit in the predetermined period at the output voltage associated with the peak light emission amount of the read-in image data for the predetermined period among the light emission amounts stored in the adjustment storage unit.

The adjustment storage unit may be configured to repeatedly store the light emission amount measured by the light emission amount measuring unit in association with each output voltage when the control unit repeatedly controls the power supplying unit to supply the power to the light emitting unit while varying the voltage of the power supplied to the light emitting unit at a predetermined voltage interval such that the output voltage measured by the output voltage measuring unit varies from a lowest voltage up to a highest voltage at the predetermined time interval, and the control unit may be configured to control the power supplying unit to read in the image data for the predetermined period and supply the power to the light emitting unit in the predetermined period at the output voltage most recently stored associated with the peak light emission amount of the read-in image data for the predetermined period among the light emission amounts stored in the adjustment storage unit.

The image output apparatus may further include a light emission amount measuring unit configured to measure the light emission amount emitted by the light emitting unit, in which the control unit may include a measured result storage unit configured to store, as a measured result, a power supply voltage supplied to the light emitting unit by the power supplying unit and the light emission amount measured by the light emission amount measuring unit in association with each other, and an estimation unit configured to estimate the voltage associated with the peak light emission amount of the light emitting unit in the image data for the predetermined period based on the measured result stored in the measured result storage unit, and the control unit may be configured to control the power supplying unit to read in the image data for the predetermined period and supply the power to the light emitting unit in the predetermined period at the voltage estimated by the estimation unit as the voltage associated with the peak light emission amount of the read-in image data for the predetermined period.

The image output apparatus may further include an adjustment storage unit configured to store the light emission amount measured by the light emission amount measuring unit in association with each voltage of the power supplied to the light emitting unit when the control unit controls the power supplying unit to supply the power to the light emitting unit while varying the voltage of the power supplied to the light emitting unit at a predetermined voltage interval from a lowest voltage up to a highest voltage at a startup time, in which the estimation unit may be configured to estimate the voltage associated with the peak light emission amount of the light emitting unit in the image data for the predetermined period based on information stored in the adjustment storage unit and the measured result stored in the measured result storage unit, and the control unit may be configured to control the power supplying unit to read in the image data for the predetermined period and supply the power to the light emitting unit in the predetermined period at the voltage estimated by the estimation unit as the voltage associated with the peak light emission amount of the read-in image data for the predetermined period.

The image output apparatus may further include a current value setting unit configured to set a current value supplied to the light emitting unit in association with intensity emitted by the light emitting unit based on the image data.

The light emitting unit may be a laser diode.

According to the first embodiment of the present technology, there is provided an operation method for an image output apparatus including: performing a light emitting process of emitting a laser beam; performing a power supplying process of supplying power at a predetermined voltage for performing the light emitting process; and performing a control process of controlling the power supplying process to supply the power for performing the light emitting process in the predetermined period at the voltage associated with a peak light emission amount by the light emitting process in image data for the predetermined period.

According to the first embodiment of the present technology, there is provided a program that causes a computer to execute a process including: a light emitting step of emitting a laser beam; a power supplying step of supplying power at a predetermined voltage for performing a process of the light emitting step; and a control step of controlling the process of the supplying power step to supply the power for performing the process of the light emitting step in a predetermined period at the voltage associated with a peak light emission amount by the process of the light emitting step in image data for the predetermined period.

According to a second embodiment of the present technology, there is provided an electronic circuit configured to at least connect a light emitting unit configured to emit a laser beam and a power supplying unit configured to supply power to the light emitting unit at a predetermined voltage, the electronic circuit including a control unit configured to control the power supplying unit to supply the power to the light emitting unit in a predetermined period at the voltage associated with a peak light emission amount of the light emitting unit in image data for the predetermined period.

The electronic circuit may be further configured to connect a light emission amount measuring unit configured to measure the light emission amount emitted by the light emitting unit, and may further include an adjustment storage unit configured to store the light emission amount measured by the light emission amount measuring unit in association with each voltage of the power supplied to the light emitting unit when the control unit controls the power supplying unit to supply the power to the light emitting unit while varying the voltage of the power supplied to the light emitting unit, in which the control unit may be configured to control the power supplying unit to read in the image data for the predetermined period and supply the power to the light emitting unit in the predetermined period at the voltage associated with the peak light emission amount of the read-in image data for the predetermined period among the light emission amounts stored in the adjustment storage unit.

The electronic circuit may be further configured to connect a light emission amount measuring unit configured to measure the light emission amount emitted by the light emitting unit, and an output voltage measuring unit configured to measure an output voltage of the light emitting unit, and may further include an adjustment storage unit configured to store the light emission amount measured by the light emission amount measuring unit in association with each output voltage of output power measured by the output voltage measuring unit when the control unit controls the power supplying unit to supply the power to the light emitting unit while varying the voltage of the power supplied to the light emitting unit such that the output voltage measured by the output voltage measuring unit varies, in which the control unit may be configured to control the power supplying unit to read in the image data for the predetermined period and supply the power to the light emitting unit in the predetermined period at the output voltage associated with the peak light emission amount of the read-in image data for the predetermined period among the light emission amounts stored in the adjustment storage unit.

The electronic circuit may be further configured to connect a light emission amount measuring unit configured to measure the light emission amount emitted by the light emitting unit, in which the control unit may include a measured result storage unit configured to store, as a measured result, a power supply voltage supplied to the light emitting unit by the power supplying unit and the light emission amount measured by the light emission amount measuring unit in association with each other, and an estimation unit configured to estimate the voltage associated with the peak light emission amount of the light emitting unit in the image data for the predetermined period based on the measured result stored in the measured result storage unit, and the control unit may be configured to control the power supplying unit to read in the image data for the predetermined period and supply the power to the light emitting unit in the predetermined period at the voltage estimated by the estimation unit as the voltage associated with the peak light emission amount of the read-in image data for the predetermined period.

According to a third embodiment of the present technology, there is provided an electronic apparatus including: a light emitting unit configured to emit a laser beam; a power supplying unit configured to supply power to the light emitting unit at a predetermined voltage; and a control unit configured to control the power supplying unit to supply the power to the light emitting unit in a predetermined period at the voltage associated with a peak light emission amount of the light emitting unit in image data for the predetermined period.

In the first to third embodiments of the present technology, the light emitting unit emits the laser beam, the power supplying unit supplies the power to the light emitting unit, and the control unit controls the power supplying unit to supply the power to the light emitting unit in the predetermined period at the voltage associated with the peak light emission amount of the light emitting unit in the image data for the predetermined period.

The image output apparatus, the electronic circuit, and the electronic apparatus according to the embodiments the present technology may be independent apparatus, circuit, and device, and also may be blocks for realizing functions as the image output apparatus, the electronic circuit, and the electronic apparatus, respectively.

According to an embodiment of the present technology, it is possible to realize reduce power consumption of the image output apparatus.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments for carrying out the present disclosure (hereinafter referred to as embodiments) will be described. Herein, the explanation will proceed in the following order.
1. First embodiment (example of using correspondence relation between light emission amount and output voltage at startup time)
2. Second embodiment (example of using correspondence relation between light emission amount and output voltage on cathode side at predetermined time interval)
3. Third embodiment (example of using correspondence relation between previous output voltage and light emission amount)

1. First Embodiment

<Configuration Example of Projection Apparatus>

Figure 1:
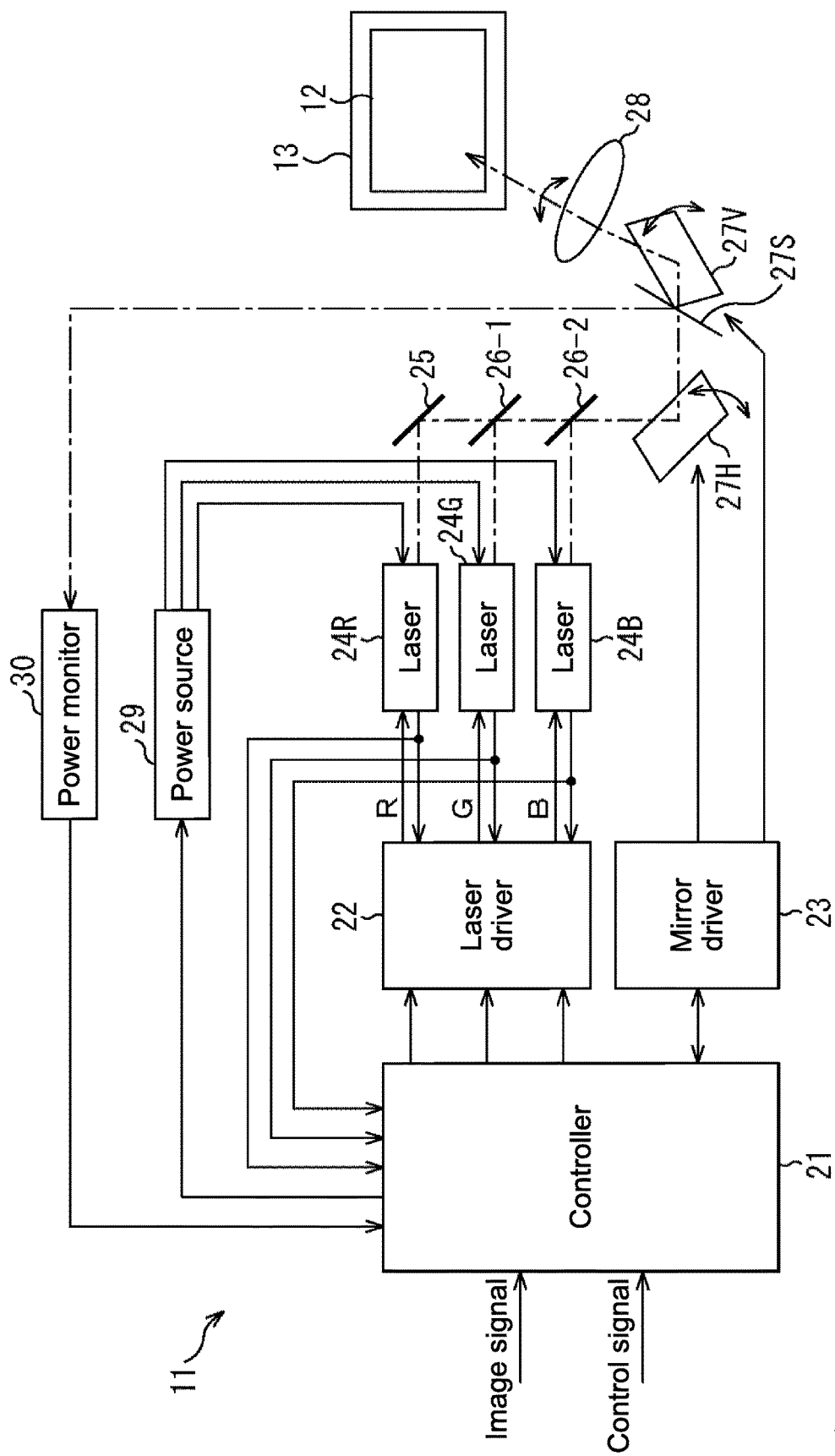
FIG. 1 is a diagram showing a configuration example of a projection apparatus according to an embodiment to which the present technology is applied.

FIG. 1 is a block diagram showing a configuration example of a projection apparatus according to an embodiment to which the present technology is applied.

In FIG. 1, a projection apparatus 11 projects, on a screen 13, an image 12 using a laser beam as a light source.

Moreover, the projection apparatus 11 includes a controller 21, a laser driver 22, a mirror driver 23, laser light sources 24R, 24G, and 24B, a mirror 25, dichroic mirrors 26-1 and 26-2, scanning mirrors 27H and 27V, a beam splitter 27S, an optical lens 28, a power source 29, and a power monitor 30.

The controller 21 generates an image signal for each of the three primary colors (red, green, and blue) representing the image 12 based on an image signal supplied from an image reproducing apparatus (not shown) and supplies the image signal to the laser driver 22 based on a synchronizing signal of a mirror supplied from the mirror driver 23. Moreover, the controller 21 receives a control signal from a host computer (not shown) and performs control in accordance with the control signal. It should be noted that a configuration of the controller 21 will be described later in detail with reference to FIG. 4.

The laser driver 22 generates a drive signal in accordance with a pixel value for each pixel of the image 12 for each color of the image signal based on the image signal supplied from the controller 21 and supplies the drive signal to the laser light sources 24R, 24G, and 24B. For example, the laser driver 22 supplies a drive signal in accordance with a red pixel value of the image signal to the laser light source 24R, supplies a drive signal in accordance with a green pixel value of the image signal to the laser light source 24G, and supplies a drive signal in accordance with a blue pixel value of the image signal to the laser light source 24B.

The mirror driver 23 generates a horizontal scan signal based on a resonance frequency of the scanning mirror 27H for scanning the laser beam in a horizontal direction of the image 12 and supplies the signal to the scanning mirror 27H. Moreover, the mirror driver 23 generates a vertical scan signal for scanning the laser beam in a vertical direction of the image 12 and supplies the signal to the scanning mirror 27V. Further, the mirror driver 23 includes a light receiving unit which detects a part of the laser beams reflected by the scanning mirrors 27H and 27V. Then, the mirror driver 23 adjusts the horizontal scan signal and the vertical scan signal based on the detected result of the light receiving unit and feed backs a detection signal to the controller 21 in accordance with the detected result of the light receiving unit. The beam splitter 27S reflects a part of the laser beams reflected by the scanning mirror 27H to the power monitor 30.

The laser light sources 24R, 24G, and 24B output laser beams of corresponding colors in accordance with the drive signal supplied from the laser driver 22. For example, the laser light source 24R outputs a red laser beam at a level in accordance with the red pixel value of the image signal. Similarly, the laser light source 24G outputs a green laser beam at a level in accordance with the green pixel value of the image signal, and the laser light source 24B outputs a blue laser beam at a level in accordance with the blue pixel value of the image signal. In a laser diode LD constituting the laser light sources 24R, 24G, and 24B, a current value flowing therethrough is controlled by power which is controlled by the controller 21 and which is supplied at a predetermined voltage by the power source 29 as well as the laser driver 22 controlled by the controller 21, such that a level which becomes a light emission amount is adjusted.

The mirror 25 reflects the red laser beam outputted from the laser light source 24R. The dichroic mirror 26-1 reflects the green laser beam outputted from the laser light source 24G and causes the red laser beam reflected by the mirror 25 to pass therethrough. The dichroic mirror 26-2 reflects the blue laser beam outputted from the laser light source 24B and causes the red laser beam reflected by the mirror 25 and the green laser beam reflected by the dichroic mirror 26-1 to pass therethrough. Then, the mirror 25 and the dichroic mirrors 26-1 and 26-2 are arranged in combination such that optical axes of the laser beams outputted from the laser light sources 24R, 24G, and 24B are coaxial.

The scanning mirrors 27H and 27V are micro-mirrors formed of Micro Electro Mechanical Systems (MEMS) for example, and respectively drive in accordance with the horizontal scan signal and the vertical scan signal supplied from the mirror driver 23. For example, the scanning mirror 27H reflects the laser beams outputted from the laser light sources 24R, 24G, and 24B and drives such that these laser beams are scanned in the horizontal direction of the image 12. Moreover, the scanning mirror 27V reflects the laser beams outputted from the laser light sources 24R, 24G, and 24B and drives such that these laser beams are scanned in the vertical direction of the image 12.

The optical lens 28 is arranged on an optical path of the laser beam traveling from the scanning mirror 27V to the screen 13 and corrects the optical path of the laser beam.

The power monitor 30 measures a light emission amount of the laser beam supplied via the beam splitter 27S and supplies information of the measured light emission amount to the controller 21. It should be noted that a configuration of the controller 21, the laser light sources 24R, 24G, and 24B, the power source 29, and the power monitor 30 will be described later in detail with reference to FIG. 5.

Further, the projection apparatus 11 may employ a configuration in which the laser driver 22 and the mirror driver 23 are integrated into the controller 21. Moreover, the projection apparatus 11 may be configured that the optical lens 28 is not arranged on the optical path of the laser beam.

Since the projection apparatus 11 is configured as described above, the scanning mirrors 27H and 27V scan the laser beam in the directions orthogonal to each other, thereby projecting the two-dimensional image 12 on the screen 13. Moreover, as a scan method of the laser beam by the scanning mirrors 27H and 27V, there are a raster scan method and a Lissajous scan method, for example. The projection apparatus 11 employs the raster scan method.

Figure 2:
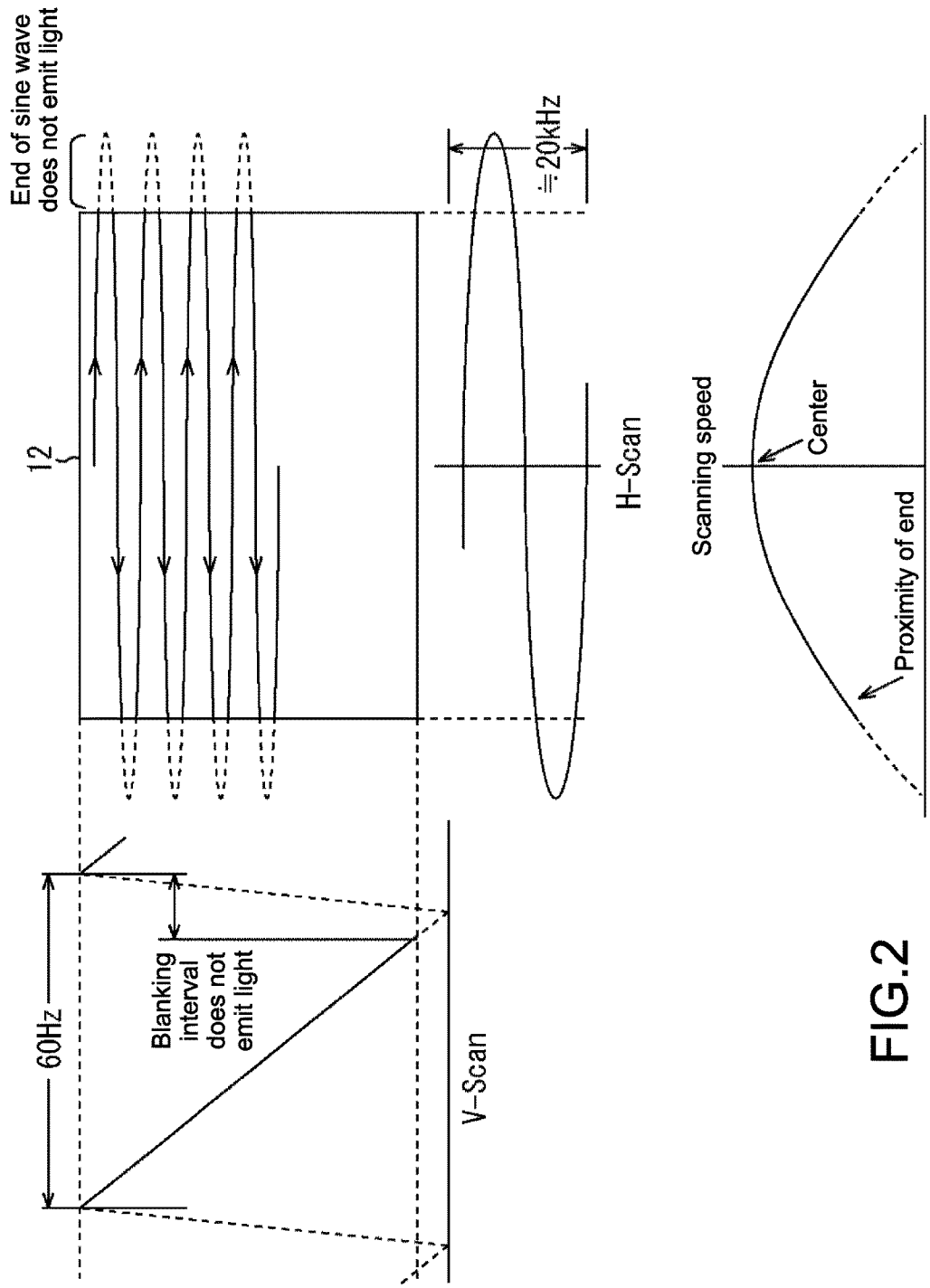
FIG. 2 is a diagram describing a raster scan by the projection apparatus in FIG. 1.

Referring to FIG. 2, the raster scan will be described.

In FIG. 2, scanning tracks of the laser beam by the raster scan are represented on the image 12, a horizontal scan signal H-Scan is represented below the image 12, and a vertical scan signal V-Scan is represented on the left of the image 12.

For example, the horizontal scan signal H-Scan is a sine wave shaped signal oscillating at approximately 20 kHz in accordance with the resonance frequency of the scanning mirror 27H and a frequency of the horizontal scan signal H-Scan is ½ of a horizontal synchronous frequency of the image 12. For example, the vertical scan signal V-Scan is a sawtooth wave shaped signal oscillating at a frequency of 60 Hz in accordance with a frame period of the image 12.

It should be noted that in the scanning tracks in the proximity of the ends of the horizontal scan signal H-Scan, the laser does not emit light, and returning portions of the scanning tracks are not used for projecting the image 12. Moreover, in an interval where the vertical scan signal V-Scan represents a wave-form rising approximately vertically, that is, in a blanking interval representing an interval where the scanning tracks of the laser beam vary steeply from the lower end toward the upper end, the laser does not emit light.

Thus, the scanning mirrors 27H and 27V are driven in accordance with the horizontal scan signal H-Scan and the vertical scan signal V-Scan, such that the laser beams are scanned by the scanning tracks as represented on the image 12. As shown FIG. 2, the laser beams are scanned in the both directions, that is, the scanning direction of the laser beams is reversed to the opposite direction for each line of scanning lines toward the horizontal direction. Therefore, it is necessary to arrange the image signal for each line of the scanning lines or vary an access direction of the data in the projection apparatus 11.

Moreover, as represented below the horizontal scan signal H-Scan, a scanning speed of the laser beam is high in the center of the image 12 and low in the proximity of the end of the image 12. Accordingly, it is assumed that uneven brightness is caused on the image 12. Therefore, the projection apparatus 11 reduces the power of the laser in the proximity of the end of the image 12 and uniformly adjusts the brightness. Similarly, the projection apparatus 11 may adjust the rate of the image signal as necessary.

Further, the laser beam is scanned in accordance with the sine wave, such that the intervals between the scanning lines toward the horizontal direction are non-uniform. In general, in an image signal standard, the image is constituted by a pixel arrangement in which pixels are arranged in the form of a lattice. Therefore, when the image signal complying with the image signal standard is outputted according to the scanning tracks of the laser beam in accordance with the sine wave, displacement occurs for each pixel in the image 12.

Figure 3:
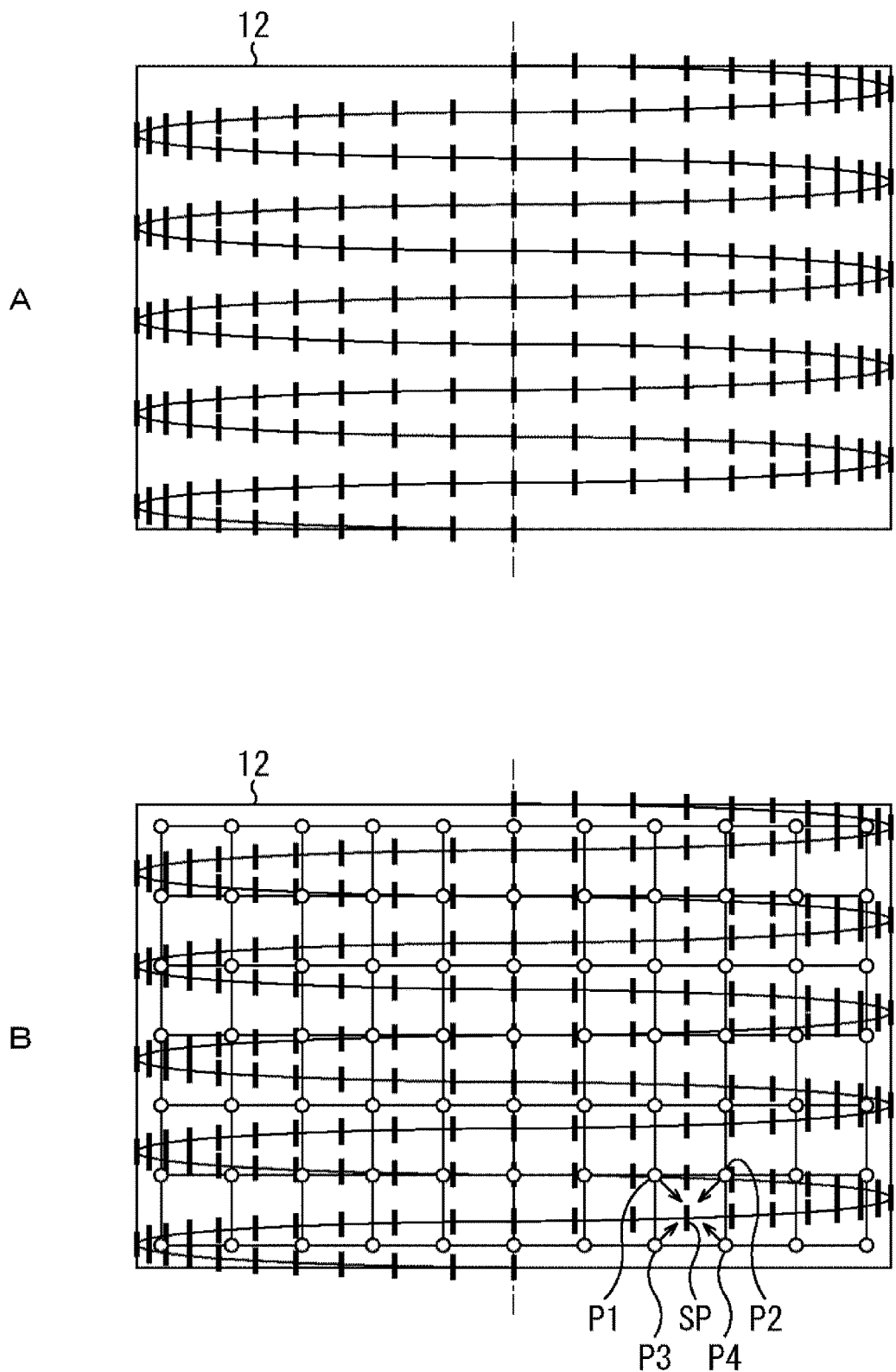
FIG. 3 is a diagram describing the raster scan by the projection apparatus in FIG. 1.

Referring to FIG. 3, the relation between the scanning tracks of the laser beam and the pixel arrangement complying with the image signal standard will be described.

A of FIG. 3 shows the scanning tracks of the laser beam and B of FIG. 3 shows a configuration in which the scanning tracks of the laser beam and the pixel arrangement complying with the image signal standard are laid together.

In FIG. 3, rectangular dots arranged at a predetermined pitch on the scanning tracks of the laser beam represent scanned pixels separated by a video clock signal synchronized with the horizontal scan signal H-Scan with respect to a track of the sinusoidal horizontal scan signal H-Scan. That is, the scanned pixels represent spots irradiated with the laser beam in accordance with the video clock.

As described above with reference to FIG. 2, the scanning speed of the laser beam is high in the center of the image 12 and low in the proximity of the end of the image 12, and the intervals between the scanning lines toward the horizontal direction are non-uniform. Therefore, as shown in A of FIG. 3, the scanned pixels are spaced largely in the center of the image 12 and are spaced narrowly in the proximity of the end of the image 12, and the intervals between the scanning pixels in the vertical direction are non-uniform.

Moreover, in B of FIG. 3, circular dots arranged in the form of a lattice represent the pixels arranged at the pixel arrangement complying with the image signal standard. As shown in B of FIG. 3, the arrangement of the scanned pixels in accordance with the scanning tracks of the laser beam is significantly different from the arrangement of the pixels complying with the image signal standard, resulting in a non-uniform timing. Therefore, when the image 12 is projected, the displacement occurs for each pixel.

Accordingly, the projection apparatus 11 performs an interpolation process for generating the pixel values in accordance with the arrangement of the scanned pixels from the pixel values of the pixel signals of the pixels, which can avoid the occurrence of displacement for each pixel in the image 12.

For example, a scanned pixel SP shown in B of FIG. 3 will be described. In the projection apparatus 11, a process for generating a pixel value of the scanned pixel SP is performed by two-dimensional interpolation in accordance with a position of the scanned pixel SP from the pixel values of four pixels P1 to P4 in the proximity of the scanned pixel SP. This process is performed to all the scanned pixels, thereby avoiding the occurrence of displacement for each pixel in the image 12. It should be noted that a pixel selection pattern used for generating the pixel value of the scanned pixel SP is not limited to the four pixels P1 to P4 as shown in B of FIG. 3. More pixels may be selected and various patterns may be used.

<Configuration Example of Controller>

Figure 4:
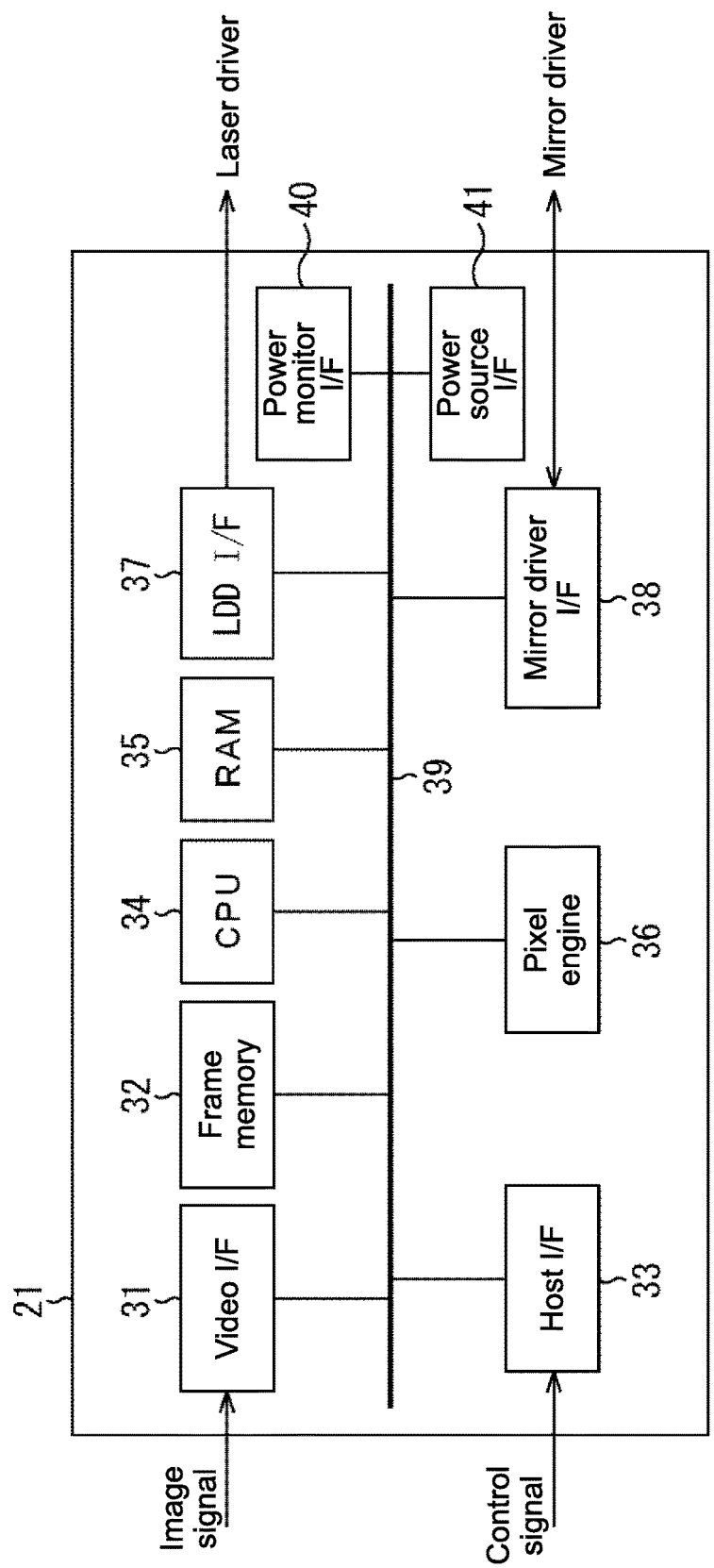
FIG. 4 is a diagram describing a configuration example of a controller in FIG. 1.

Next, FIG. 4 is a block diagram showing a configuration example of the controller 21.

As shown in FIG. 4, the controller 21 includes a video interface (I/F) 31, a frame memory 32, a host I/F 33, a Central Processing Unit (CPU) 34, a Random Access Memory (RAM) 35, a pixel engine 36, a Laser Diode Driver (LDD) I/F 37, a mirror driver I/F 38, a power monitor I/F 40, and a power source I/F 41 which are connected via a bus 39.

The video I/F 31 is connected to an image reproducing apparatus (not shown), receives the image signal of the image 12 reproduced by the image reproducing apparatus, and supplies the image signal to the frame memory 32 via the bus 39. The frame memory 32 stores the image signal for each frame of the image 12. The host I/F 33 is connected to a host controller (not shown), receives a control signal outputted from the host controller, and supplies the control signal to the CPU 34 via the bus 39.

The CPU 34 executes a program expanded into the RAM 35 and processes the image 12 stored in the frame memory 32 in accordance with the control signal supplied from the host I/F 33 and various kinds of information stored in the RAM 35. The RAM 35 stores the program executed by the CPU 34 and the various kinds of information necessary for performing the process by the CPU 34 or the pixel engine 36.

The pixel engine 36 executes the process to the image signal stored in the frame memory 32 in accordance with the information stored in the RAM 35. For example, as described with reference to FIG. 3, the pixel engine 36 performs the process for generating the pixel value of the scanned pixel SP by the two-dimensional interpolation in accordance with the position of the scanned pixel SP from the pixel values of the four pixels P1 to P4 in the proximity of the scanned pixel SP. It should be noted that the pixel engine 36 may perform a process by setting the information stored in the RAM 35 to a register of the pixel engine 36 and by storing, at a time, the image signal stored in the frame memory 32, in a buffer of the pixel engine 36.

The LDD I/F 37 is connected to the laser driver 22 shown in FIG. 1 and supplies the image signal to the laser driver 22 in accordance with the pixel value generated by the pixel engine 36. As a result, the laser driver 22 causes the laser light sources 24R, 24G, and 24B to emit light, and an image projection for projecting the image 12 to the screen 13 is executed.

The mirror driver I/F 38 is connected to the mirror driver 23 shown in FIG. 1, obtains the synchronizing signal from the mirror driver 23, and adjusts the synchronizing signal in accordance with the detection signal supplied from the mirror driver 23.

The power monitor I/F 40 is connected to the power monitor 30 shown in FIG. 1, and obtains information of the light emission amount of the laser beam emitted by the laser light sources 24R, 24G, and 24B and measured by the power monitor 30 via the beam splitter 27S.

The power source I/F 41 is connected to the power source 29 shown in FIG. 1, controls the power source 29 in accordance with the pixel value generated by the pixel engine 36, supplies power to the laser diode constituting the laser light sources 24R, 24G, and 24B, and causes the laser diode to emit light.

Since the controller 21 is configured as described above, a process is performed in the controller 21 with respect to the image signal of the image 12 inputted to the controller 21 and the processed image signal is outputted to the laser driver 22 and the power source 29.

<Configuration Example of Power Control Mechanism for Realizing Power Saving of Power Source>

Figure 5:
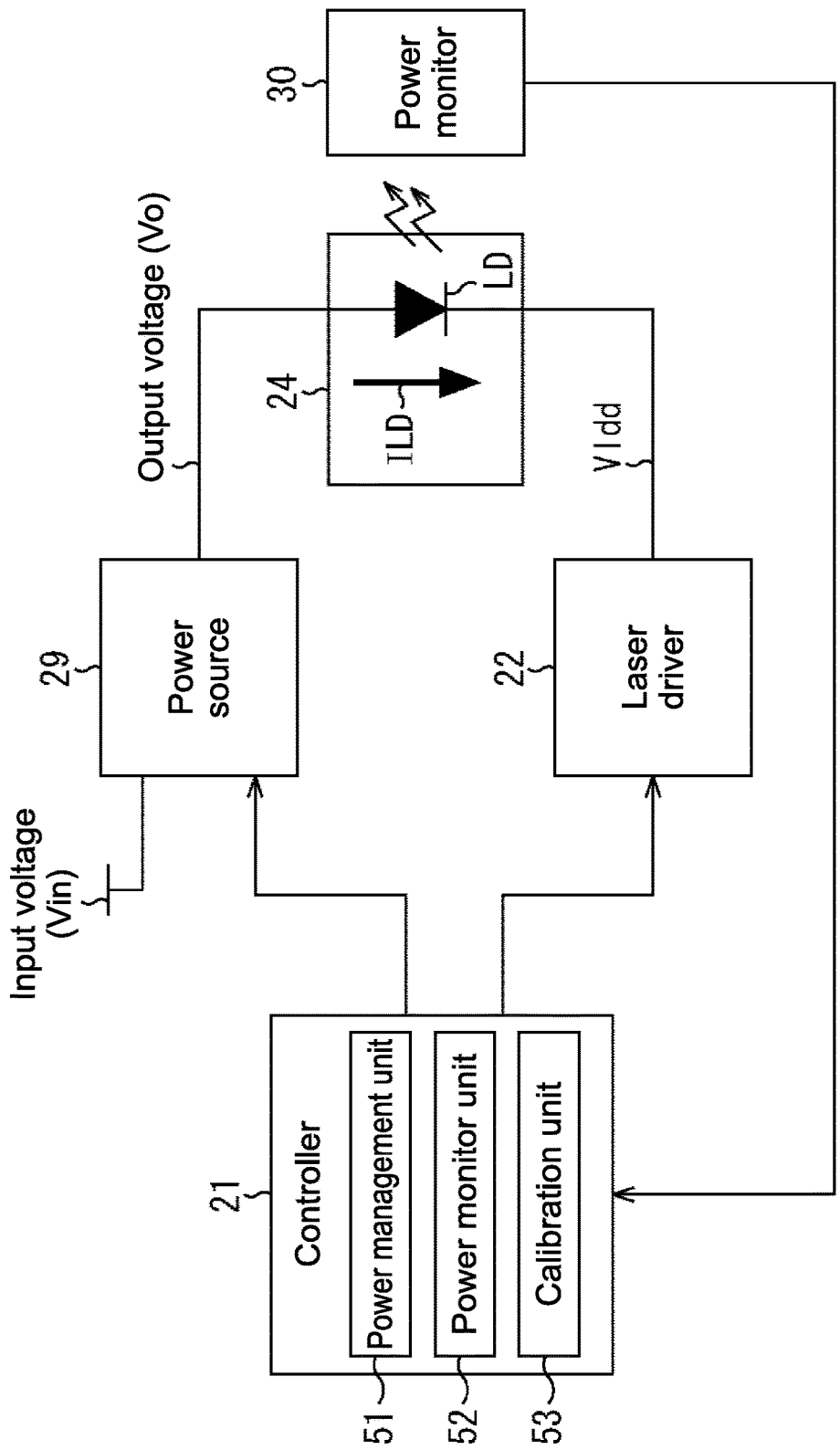
FIG. 5 is a diagram showing a configuration example of a power control mechanism of a projection apparatus according to a first embodiment to which the present technology is applied.

Next, a function of the power control mechanism for realizing power saving of the power source 29 will be described with reference to FIG. 5. FIG. 5 is a block diagram in which only configurations for realizing the function of the power control mechanism in the projection apparatus 11 shown in FIG. 1 are extracted. The power control mechanism in FIG. 5 includes the controller 21, the laser driver 22, the laser diode LD constituting the laser light sources 24R, 24G, and 24B, the power source 29, and the power monitor 30. It should be noted that the laser light sources 24R, 24G, and 24B are simply referred to as the laser light sources 24 if they are not necessary to be distinguished individually. The other configurations will be referred to likewise.

The CPU 34 executes a process based on a program and data recorded in the RAM 35 and the like, such that the controller 21 realizes a configuration including a power management unit 51, a power monitor unit 52, and a calibration unit 53. It should be noted that FIG. 5 shows an example when the power management unit 51, the power monitor unit 52, and the calibration unit 53 are realized by executing the process based on the program and data recorded in the RAM 35 and the like by the CPU 34. However, the power management unit 51, the power monitor unit 52, and the calibration unit 53 may be each configured by independent hardware.

The power management unit 51 supplies information of an output voltage to be outputted to the power source 29 based on an inputted image signal and applies the corresponding output voltage to an anode of the laser diode LD. The power monitor unit 52 obtains information of the light emission amount by the light emission of the laser diode LD constituting the laser light sources 24 measured by the power monitor 30. The calibration unit 53 controls the power management unit 51 and varies the voltage while raising the voltage at a predetermined voltage interval from the lowest voltage or lowering the voltage at a predetermined voltage interval from the highest voltage when the projection apparatus 11 is started. Therefore, the calibration unit 53 measures a light emission amount which is a light emission level of the laser diode LD of the laser light sources 24 obtained by the power monitor unit 52 and measured by the power monitor 30 in the whole range of the output voltage which can be outputted, and stores the light emission amount and the output voltage which are the measured result in association with each other as a calibration result.

While calibration information is stored in the calibration unit 53, the power management unit 51 reads out the inputted image signal in a frame unit and extracts information of the light emission amount which becomes a peak light emission amount among the image signals of the frame which is read out. Then, the power management unit 51 reads out the output voltage associated with the light emission amount which becomes the peak light emission amount from the relation between the light emission amount and the output voltage stored in the calibration unit 53 and controls the power source 29 to supply power at the output voltage which is read out.

The laser driver 22 is connected on a cathode side of the laser diode LD constituting the laser light sources 24 and sets a current value ILD flowing into the laser diode LD based on the inputted image signal. Moreover, the laser driver 22 needs to be driven with a lowest voltage Vldd. The power source 29 is a so-called DCDC converter for converting an input voltage Vin to an output voltage Vo which is formed of a predetermined voltage and outputting the output voltage Vo. Moreover, the power source 29 converts the input voltage Vin to the output voltage Vo designated under control of the power management unit 51 of the controller 21 and supplies power which is formed of the output voltage Vo to the anode of the laser diode LD of the laser light sources 24.

Herein, in the case of the output voltage Vo, a loss Pld in the laser diode LD is represented by equation (1) below.

$$Pld = Vo \times ILD \qquad (1)$$

Herein, ILD is a current value flowing into the laser diode. Moreover, when a voltage drop is Vfld in the laser diode LD, the output voltage Vo needs to be at least (Vfld+Vldd) or more.

For example, the power monitor 30 is a photo diode and the like for measuring the light emission amount when the laser diode LD emits light. The power monitor 30 supplies the information of the measured light emission amount to the controller 21.

<Calibration Process Performed by Power Control Mechanism in FIG. 5>

Figure 6:
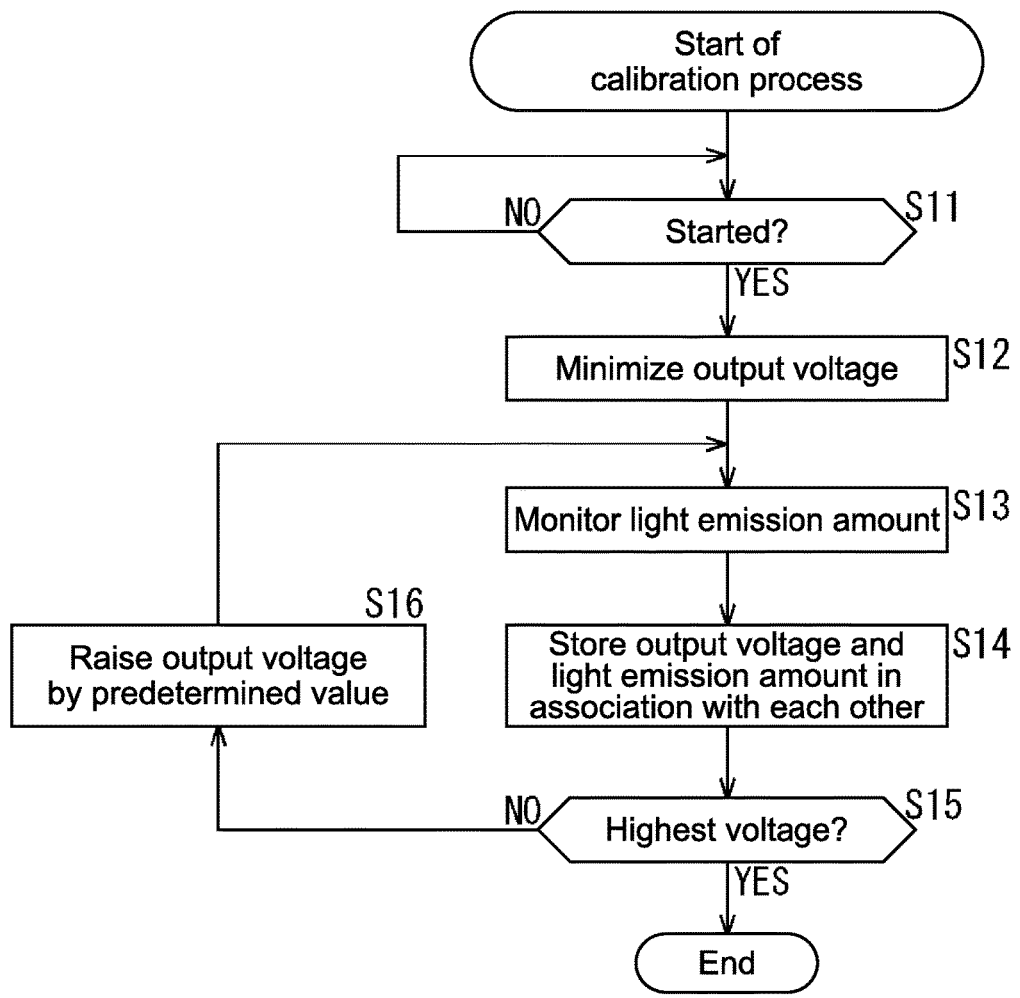
FIG. 6 is a flowchart describing a calibration process performed by the power control mechanism in FIG. 5.

Next, referring to a flowchart in FIG. 6, a calibration process performed by the power control mechanism in FIG. 5 will be described.

In step S11, the power management unit 51 of the controller 21 determines whether or not an operation unit provided on a configuration (not shown) is operated and the projection apparatus 11 is started, and repeats the same process until started. Then, when it is determined in step S11 that the projection apparatus 11 is started, the process proceeds to step S12.

In step S12, the power management unit 51 causes the power source 29 to set the lowest voltage among the output voltages which can be outputted and applies the lowest voltage to the anode of the laser diode LD of the laser light sources 24.

In step S13, the power monitor unit 52 controls the power monitor 30 to measure the light emission amount of the laser diode LD, and obtains the information of the measured light emission amount.

In step S14, the calibration unit 53 obtains information of the output voltage Vo of the power currently outputted by the power source 29 from the power management unit 51 and stores the information in association with the information of the light emission amount measured by the power monitor 30.

In step S15, the power management unit 51 determines whether or not the output voltage Vo outputted by the power source 29 is the highest voltage. When it is not the highest voltage, the process proceeds to step S16.

In step S16, the power management unit 51 raises the output voltage Vo by a predetermined value and causes the power source 29 to output to the laser diode LD, and the process returns to step S13.

That is, until it is determined in step S15 that the output voltage Vo is the highest voltage, the processes in steps S13 to S16 are repeated. The calibration result where the output voltage Vo rising at the voltage of the predetermined interval is associated with the light emission amount is sequentially stored in the calibration unit 53.

Then, when it is determined in step S15 that the output voltage Vo is the highest voltage, the process is completed.

Figure 7:
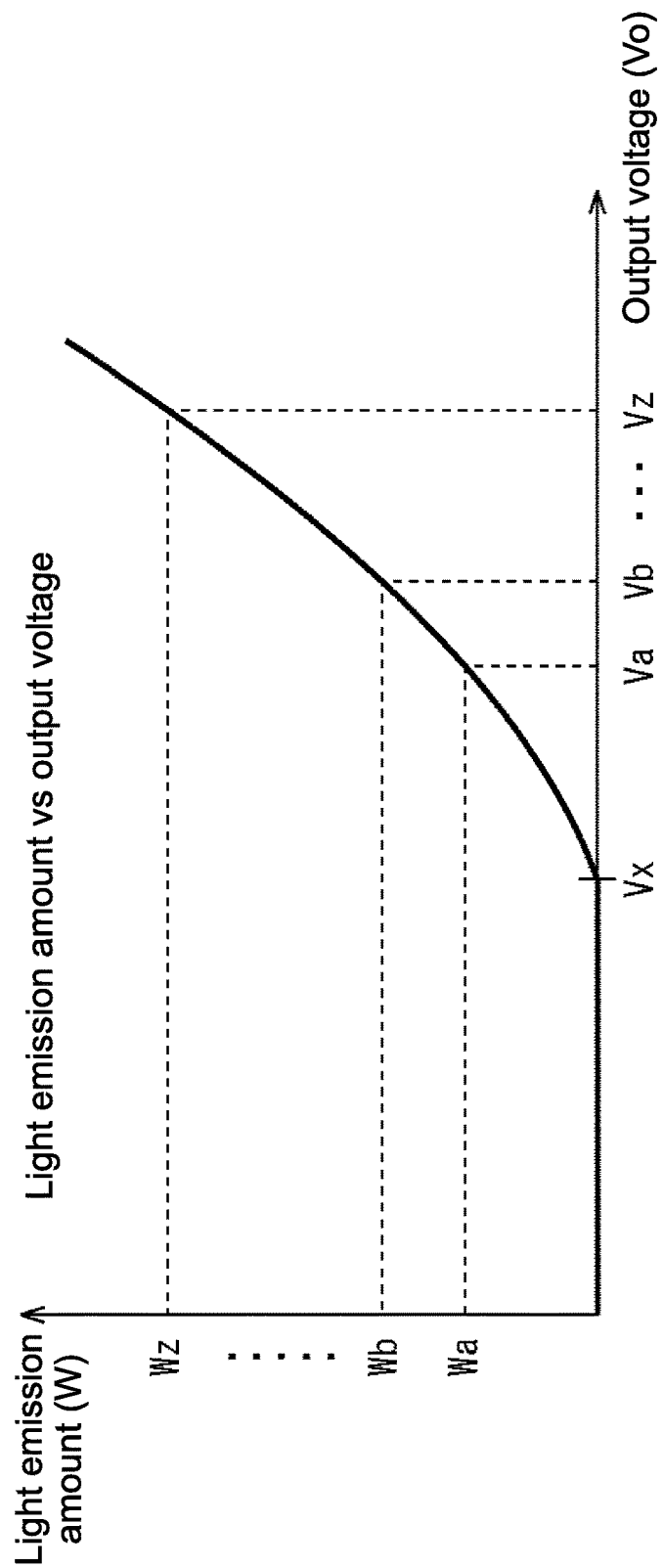
FIG. 7 is a diagram describing a calibration result of the calibration process performed by the power control mechanism in FIG. 5.

By the above-mentioned processes, the processes in steps S13 to S16 are repeated, such that the calibration result having information representing the relation as shown in FIG. 7 is stored in the calibration unit 53, for example. In FIG. 7, the horizontal axis represents the output voltage Vo, while the vertical axis represents the light emission amount. As shown in FIG. 7, the output voltage Vo and the light emission amount are represented as (Va, Wa), (Vb, Wb), . . . (Vz, Wz), respectively. That is, the laser diode LD does not emit light until the output voltage Vo reaches a lowest drive voltage Vx of the laser driver 22. The laser diode LD starts to emit light from a point exceeding the lowest drive voltage Vx. Then, the light emission amount of the laser diode LD becomes larger in proportion to the output voltage Vo.

Thus, the calibration result representing a correspondence relation between the output voltage Vo and the light emission amount is stored in the calibration unit 53. As a result, the power management unit 51 in the controller 21 controls the power source 29 to apply the output voltage Vo associated with the light emission amount which becomes the peak light emission amount among the image signals of the frame unit to the anode of the laser diode LD, thereby realizing power saving.

<Output Voltage Control Process Performed by Power Control Mechanism in FIG. 5>

Figure 8:
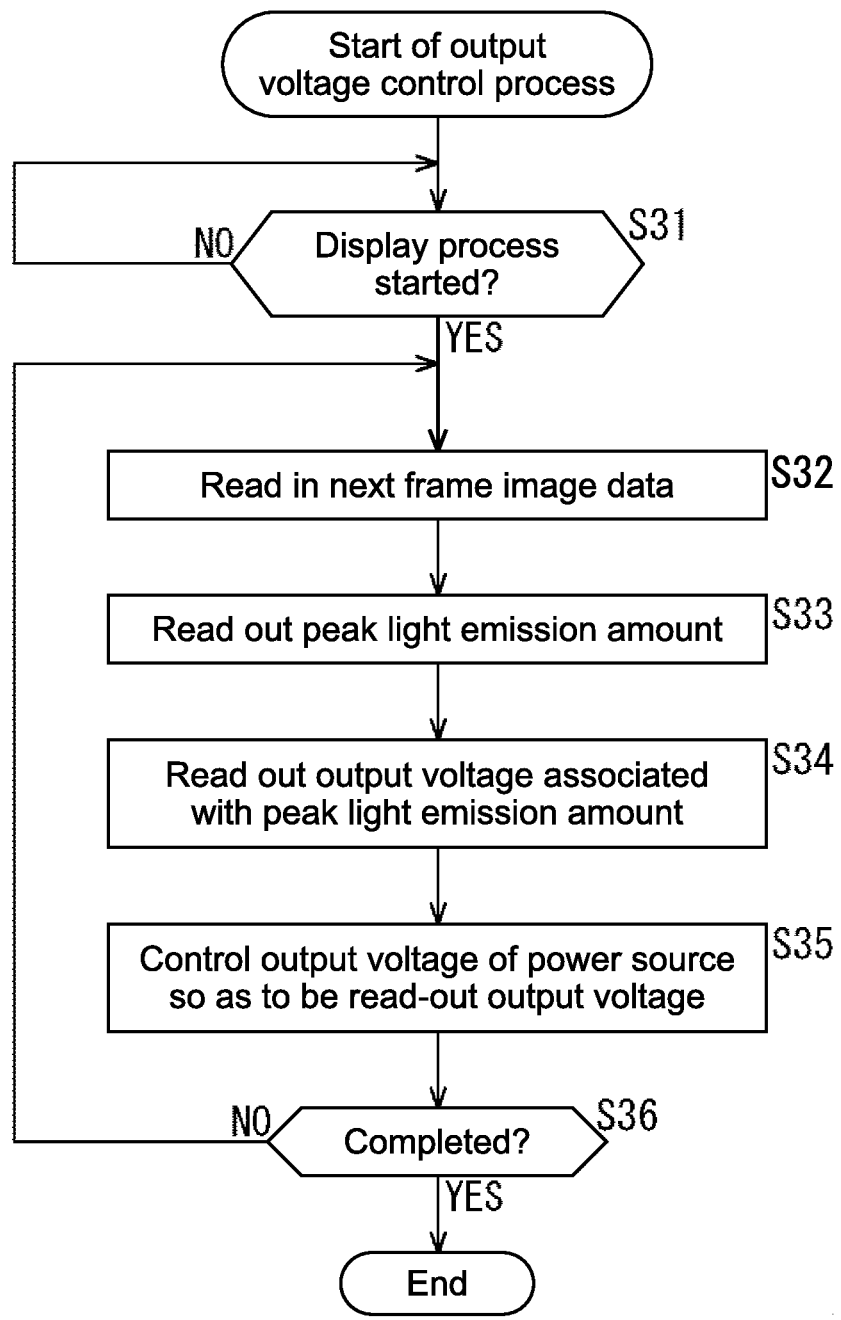
FIG. 8 is a flowchart describing an output voltage control process performed by the power control mechanism in FIG. 5.

Next, referring to a flowchart in FIG. 8, an output voltage control process performed by the power control mechanism in FIG. 5 when causing the laser diode LD to emit light based on the image signals will be described.

In step S31, the power management unit 51 of the controller 21 determines whether or not an image display is instructed based on the image signals and repeats the same process until the display is started based on this instruction. Then, when it is determined in step S31 that the display is started, the process proceeds to step S32.

In step S32, the power management unit 51 reads out image signals of one frame to be displayed next among the displayed image signals.

In step S33, the power management unit 51 reads out the peak light emission amount which becomes the maximum light emission amount among the read-out image signals of one frame to be displayed next.

In step S34, the power management unit 51 reads out the calibration information, as shown in FIG. 7, for example, representing the relation between the output voltage and the light emission amount stored in the calibration unit and reads out the output voltage Vo associated with the light emission amount which becomes the peak light emission amount.

In step S35, the power management unit 51 controls the power source 29 to supply power to the anode of the laser diode LD at the output voltage Vo associated with the read-out peak light emission amount.

In step S36, the power management unit 51 determines whether or not the image signal is completed depending on whether the image signal of the next frame is present or absent. When the image signal is not completed, the process returns to step S32. That is, until the image signal is completed, the processes in steps S32 to S36 are repeated.

Then, it is determined in step S36 that when the image signal of the next frame does not exist and the image signal is completed, the process is completed.

Figure 9:
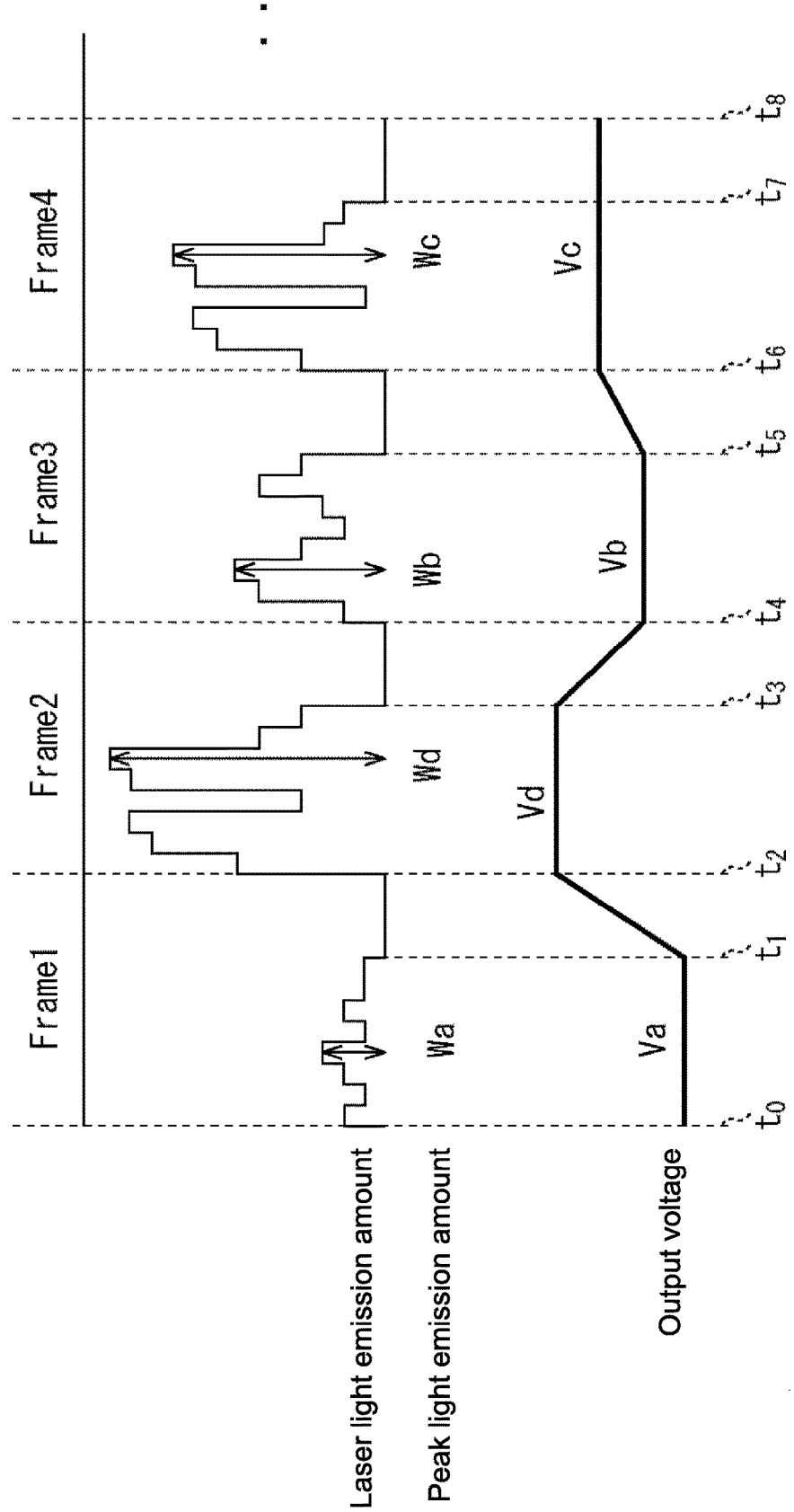
FIG. 9 is a diagram describing the output voltage control process performed by the power control mechanism in FIG. 5.

By the above-mentioned processes, the output voltage Vo outputted by the power source 29 is controlled as shown in FIG. 9, for example. That is, when an image signal of a first frame represented by a Frame1 is supplied in times t0 to t2, the peak light emission amount is a light emission amount Wa among laser light emission amounts (light emission amounts measured by light emission of the laser diode LD) shown in an upper section of FIG. 9. Accordingly, as shown in a lower section of FIG. 9, in the times t0 to t1 at which the first frame is displayed, power of an output voltage Va associated with the light emission amount Wa is applied from the power source 29 to the laser diode LD. Further, at the time t1 at which output of the image signal of the first frame is completed, an image signal of a second frame represented by a Frame 2 which is the next frame is read in.

The image signal of the second frame shown in the upper section of FIG. 9 is an image signal outputted at times t2 to t3 and its peak light emission amount is Wd. Accordingly, in the times t2 to t3, as shown in the lower section of FIG. 9, the power of the output voltage Vd associated with the peak light emission amount Wd is applied from power source 29 to the anode of the laser diode LD. Then, at the time t3 at which output of the image signal of the second frame is completed, an image signal of a third frame represented by a Frame 3 which is the next frame is read in.

Moreover, the image signal of the third frame shown in the upper section of FIG. 9 is an image signal outputted at times t4 to t5 and its peak light emission amount is Wb. Accordingly, in the times t4 to t5, as shown in the lower section of FIG. 9, the power of the output voltage Vb associated with the peak light emission amount Wb is applied from the power source 29 to the anode of the laser diode LD. Then, at the time t5 at which output of the image signal of the third frame is completed, an image signal of a fourth frame represented by a Frame 4 which is the next frame is read in.

Further, the image signal of the fourth frame shown in the upper section of FIG. 9 is an image signal outputted at times t6 to t7 and its peak light emission amount is Wc. Accordingly, in the times t6 to t7, as shown in the lower section of FIG. 9, the power of the output voltage Vc associated with the peak light emission amount Wc is applied from the power source 29 to the anode of the laser diode LD.

By the above-mentioned controls, the power supplied to the laser diode LD by the power source 29 can be saved.

Figure 10:
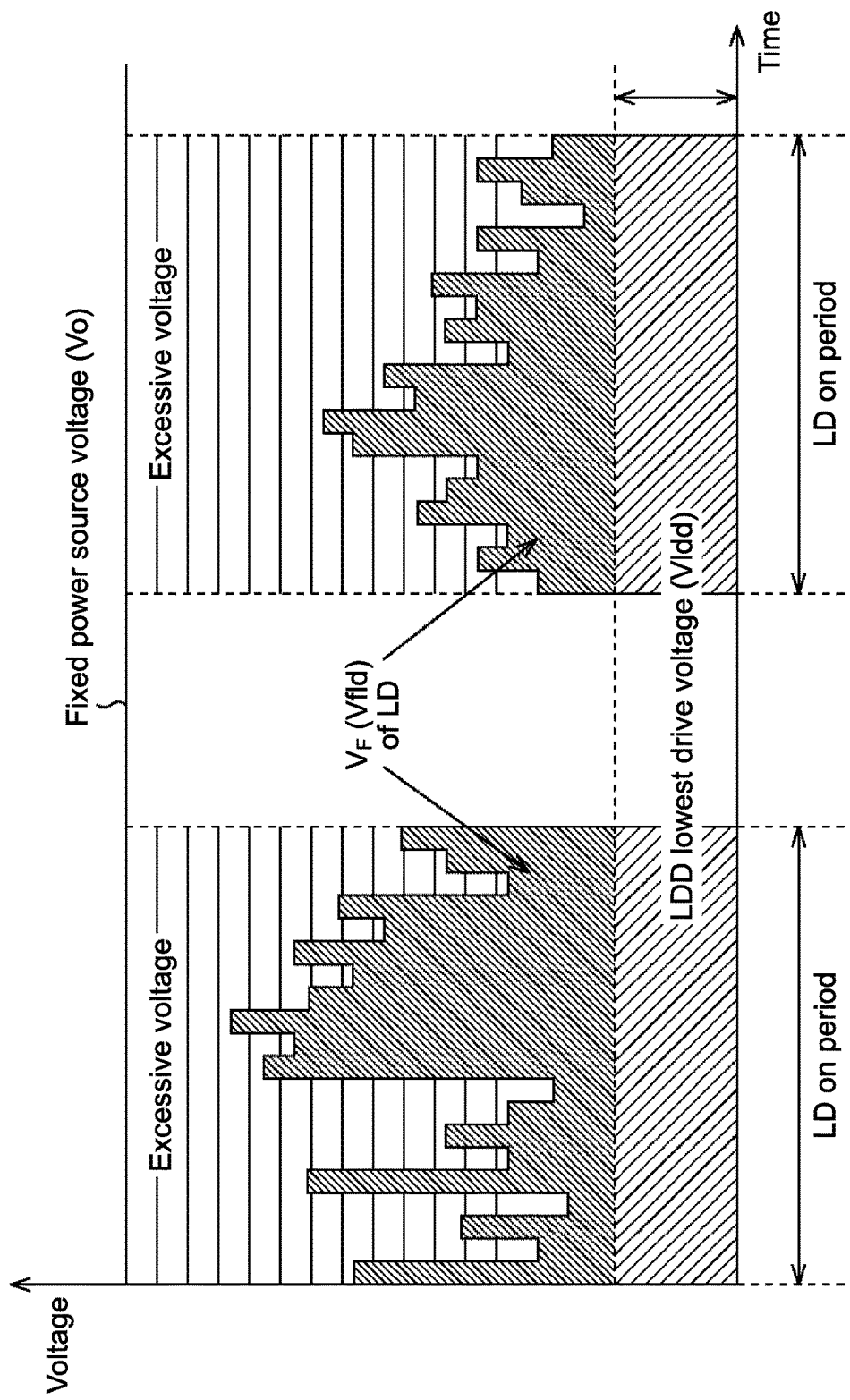
FIG. 10 is a diagram describing an output voltage control process performed by a power control mechanism of the related art.

That is, as shown in FIG. 10 in the related art, the power supplied from the power source 29 is a fixed power source voltage at which the output voltage Vo is fixed. Therefore, a larger amount of power is consumed than actually necessary power consumption. It should be noted that in FIG. 10, the vertical axis represents the voltage of the output voltage Vo, while the horizontal axis represents a time. Moreover, "LD on period" is a period where an image signal of one frame is displayed. Voltages represented by dashed lines are voltages (Vldd) necessary for driving the laser driver 22. The voltages above the dashed lines are voltage drops (VF (=Vfld)) of the laser diode in accordance with a current value set corresponding to the image signal. That is, in order to emit light of the light emission amount associated with the image signal, the voltages to be applied to the laser diode LD are (Vldd+Vfld) as described above. However, in the related art, the output voltage Vo which is formed of both applied voltages more than necessary is outputted continuously as the fixed voltage such that any image signal can be emitted.

Therefore, an excessive voltage equivalent to the difference between the fixed voltage and the necessary output voltage is applied. It should be noted that in FIGS. 10 and 11, a wasted region due to the excessive applied voltage is represented by horizontal stripes.

Figure 11:
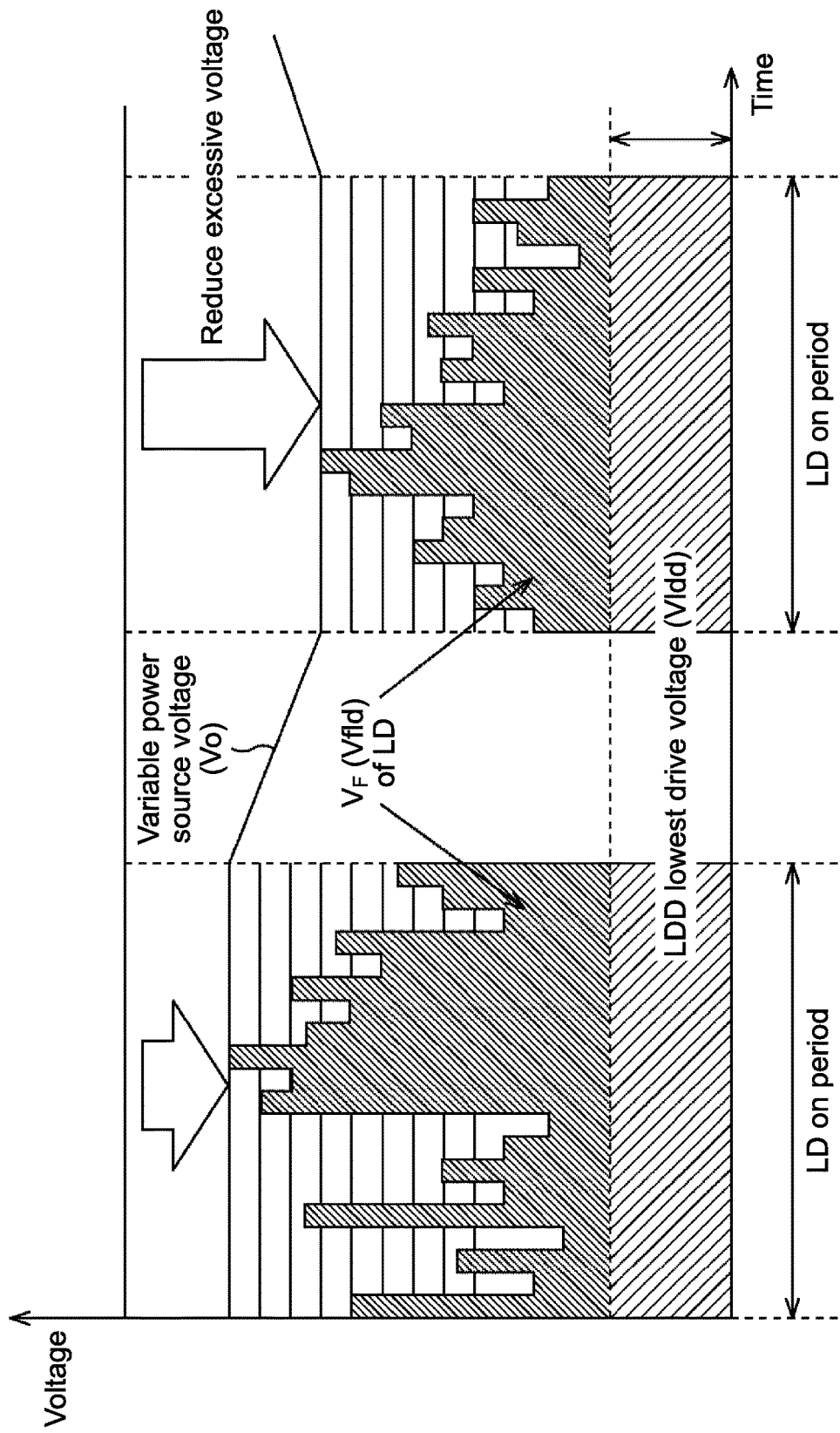
FIG. 11 is a diagram describing the output voltage control process performed by the power control mechanism in FIG. 5.

On the contrary, since the output voltage control process is performed as described with reference to the flowchart in FIG. 8, the output voltage Vo of the power outputted by the power source 29 is set as a variable power source voltage to be the output voltage Vo associated with the peak light emission amount necessary in each frame unit as shown in FIG. 11. Thus, since the power supplied by the power source 29 is set as the variable power source voltage to be the output voltage Vo associated with the peak light emission amount in the frame unit, excess power generated by being set as the fixed power source voltage is suppressed. As a result, the power supplied to the laser diode LD by the power source 29 can be saved. That is, the region of the horizontal stripes representing the excess power in FIG. 11 is smaller than the region shown in FIG. 10, thereby realizing power saving.

Moreover, it is possible to cope with the lowest voltage necessary for the laser driver 22 and variations of the voltage drop Vfld caused by the laser diode LD by the calibration process executed at a startup time. The necessary output voltage Vo is set in the frame unit appropriately, which can realize more appropriate power saving. It should be noted that in the above, the example has been described in which power saving is achieved by making the output voltage Vo variable according to the peak light emission amount in the frame unit. Alternatively, power saving can be realized even when the output voltage Vo associated with the peak light emission amount of every predetermined period different from the frame unit is set to be variable.

2. Second Embodiment

<Another Configuration Example of Power Control Mechanism for Realizing Power Saving of Power Source>

In the above, the example has been described in which the calibration process is executed at the startup time to store the output voltage Vo and the light emission amount measured by the power monitor 30 at that time in association with each other, and supply the output voltage Vo associated with the peak light emission amount in the frame unit, thereby realizing power saving. However, the laser diode LD is known to have a temperature characteristic in which the voltage drops Vfld vary depending on a temperature. Therefore, there is a fear that an operating time is longer with only the calibration result set at the startup time and it is difficult to cope with temperature characteristic with varying temperature of the laser diode LD due to varying in ambient air temperature. Accordingly, the power control mechanism may realize the power saving while coping with the temperature characteristic such that the power control mechanism repeatedly executes, at a predetermined time interval, the calibration process for measuring the light emission amount in association with the voltage Vc on the cathode side of the laser diode LD instead of the output voltage Vo, and feedback-controls the output voltage Vo by using the most recent calibration result to be the voltage Vc associated with the necessary peak light emission amount.

Figure 12:
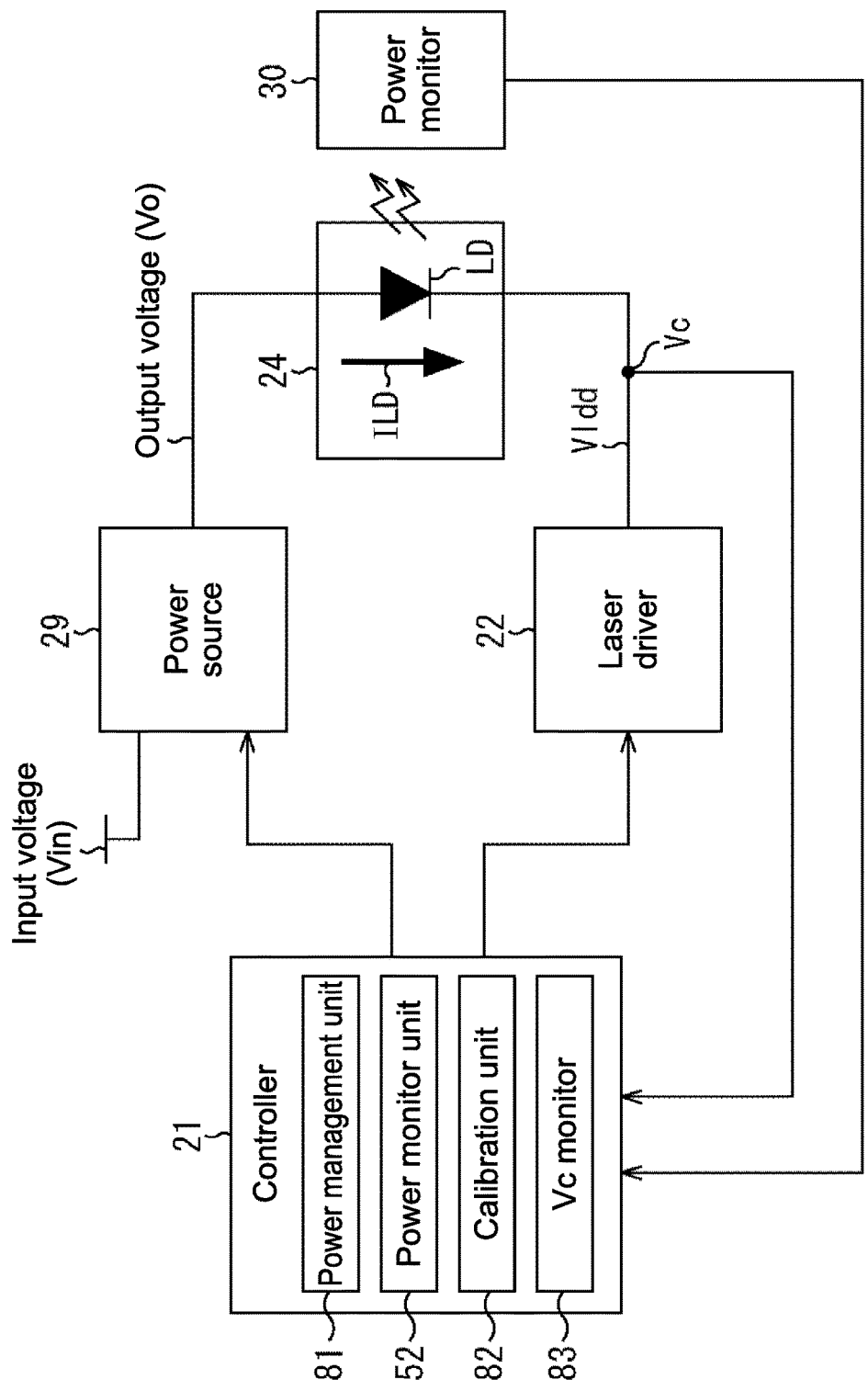
FIG. 12 is a diagram showing a configuration example of a power control mechanism of a projection apparatus according to a second embodiment to which the present technology is applied.

Referring to FIG. 12, a function of the power control mechanism which executes, at the predetermined time interval, the calibration process for measuring the light emission amount in association with the voltage Vc on the cathode side of the laser diode LD instead of the output voltage Vo and controlling the power source 29 by using the most recent calibration result will be described. It should be noted that components having the same functions as the components of the power control mechanism in FIG. 5 are represented by the same names and reference numerals, and descriptions thereof are omitted when appropriate.

That is, the power control mechanism in FIG. 12 differs from the power control mechanism in FIG. 5 in a configuration including a power management unit 81, a calibration unit 82, and a Vc monitor unit 83 which is newly provided, instead of the power management unit 51 of the controller 21 and the calibration unit 53. The Vc monitor unit 83 measures the voltage Vc on the cathode side of the laser diode LD. Moreover, the power management unit 81 repeatedly stores, in the calibration unit 53 at a predetermined time interval as the calibration result, the relation between the voltage Vc on the cathode side of the laser diode LD, instead of the output voltage Vo, and the light emission amount measured by the power monitor 30. Further, the power control unit 81 reads out the voltage Vc on the cathode side of the laser diode LD associated with the peak light emission amount of the image signal of the frame to be displayed next when an image is displayed based on the image signal and feedback-controls the output voltage Vo of the power source 29 such that the voltage Vc measured by the Vc monitor unit 83 is a value which is read out.

<Calibration Process Performed by Power Control Mechanism in FIG. 12>

Figure 13:
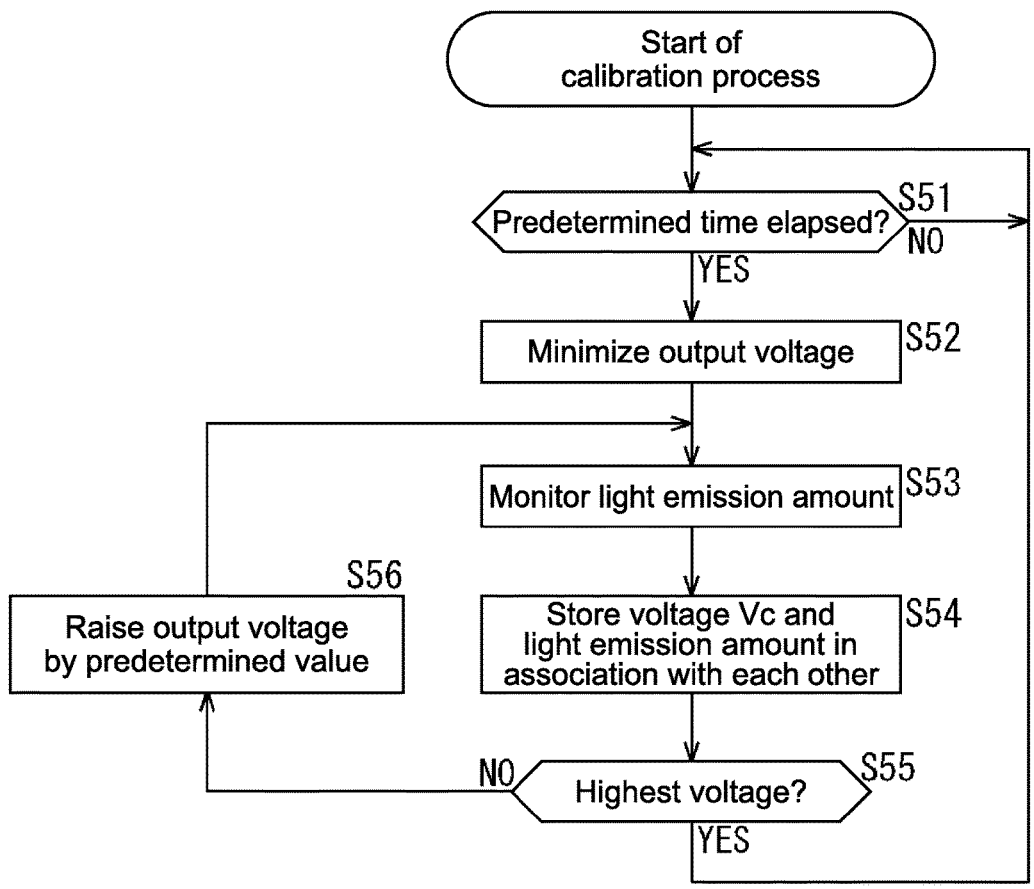
FIG. 13 is a flowchart describing a calibration process performed by the power control mechanism in FIG. 12.

Next, referring to a flowchart in FIG. 13, the calibration process performed by the power control mechanism in FIG. 12 will be described.

In step S51, the power control unit 81 of the controller 21 determines whether or not a predetermined time has elapsed from a timing most recently calibrated and repeats the same process until the predetermined time passes. Then, when it is determined in step S51 that the predetermined period of time has elapsed, the process proceeds to step S52. It should be noted that a first process may be determined as the predetermined time has elapsed.

In step S52, the power control unit 81 controls the power source 29 to adjust the output voltage Vo of the power source 29 such that the output voltage Vo is minimized, and applies the output voltage Vo on the anode side of the laser diode LD.

In step S53, the power monitor unit 52 controls the power monitor unit 30 to measure the light emission amount of the laser diode LD, and obtains the information of the measured light emission amount.

In step S54, the calibration unit 82 obtains information of the voltage Vc on the cathode side of the laser diode LD measured by the current Vc monitor unit 83 and stores the information, as the calibration result, in association with the information of the light emission amount measured by the power monitor unit 30.

In step S55, the power management unit 81 determines whether or not the output voltage Vo outputted by the power source 29 is the highest voltage. When it is not the highest voltage, the process proceeds to step S56.

In step S56, the power management unit 81 raises the output voltage Vo by a predetermined value and causes the power source 29 to output to the laser diode LD, and the process returns to step S53.

That is, until it is determined in step S55 that the output voltage Vo is the highest voltage, the processes in steps S53 to S56 are repeated. The calibration result in which each voltage Vc and the light emission amount are associated with each other is sequentially stored in the calibration unit 82.

Then, when it is determined in step S55 that the output voltage Vo is the highest voltage, the process returns to step S51. That is, in the following, the processes in steps S52 to S56 are repeated every time the predetermined time elapses, the calibration process is repeated, and the calibration result is sequentially stored (renewed).

By the above-mentioned processes, since the processes in steps S52 to S56 are repeated at the predetermined time interval, the information representing the relation between the voltage Vc on the cathode side of the laser diode LD and the light emission amount is repeatedly stored into calibration unit 82.

Thus, since the calibration result representing the correspondence relation between the voltage Vc and the light emission amount is repeatedly stored into the calibration unit 82, while checking the voltage Vc on the cathode side of the laser diode LD by Vc monitor unit 83 when the power management unit 51 in the controller 21 causes the laser diode LD to emit light in accordance with the image signal based on the calibration result, the power management unit 51 feedback-controls the output voltage Vo outputted by the power source 29 to be the voltage Vc associated with the light emission amount, thereby realizing power saving corresponding to the temperature characteristic of the laser diode LD.

<Output Voltage Control Process Performed by Power Control Mechanism in FIG. 12>

Figure 14:
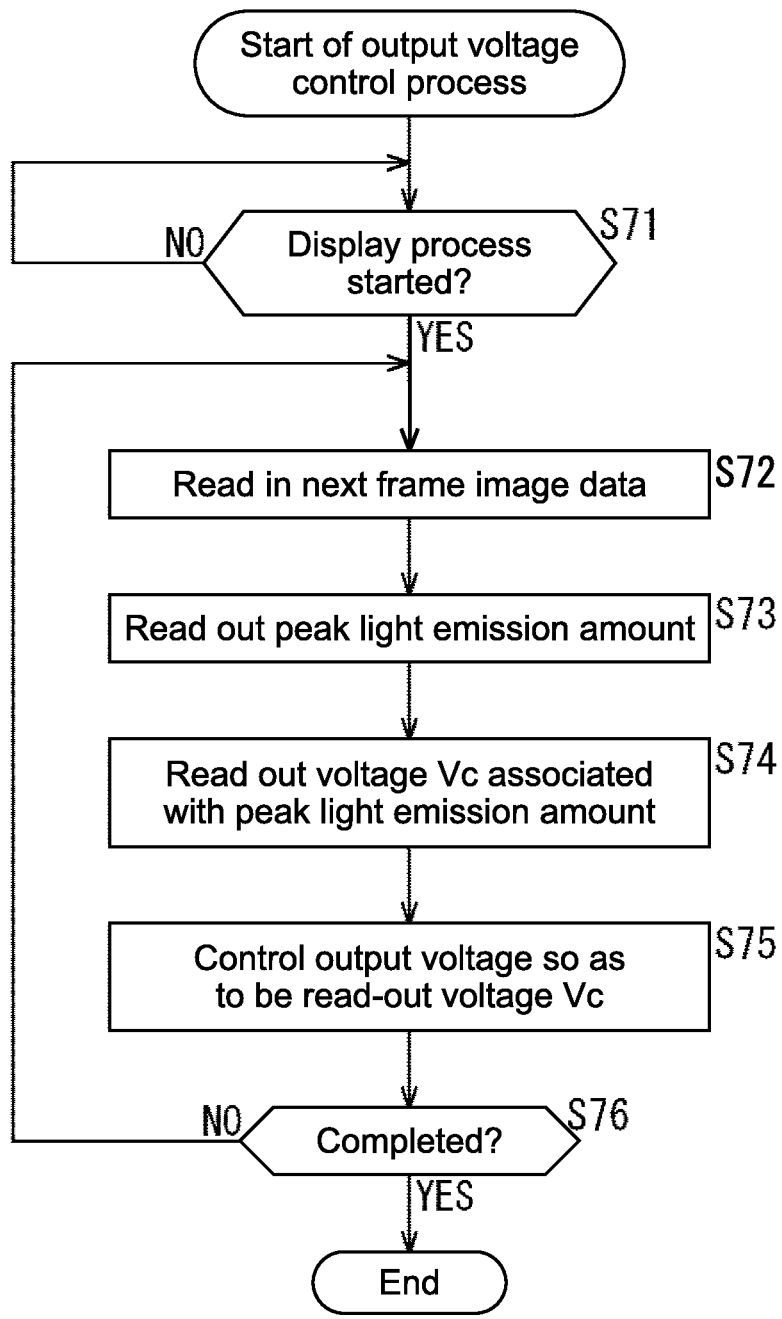
FIG. 14 is a flowchart describing an output voltage control process performed by the power control mechanism in FIG. 12.

Next, referring to a flowchart in FIG. 14, an output voltage control process when the power control mechanism in FIG. 12 causes the laser diode LD to emit light based on the image signals will be described.

In step S71, the power management unit 81 of the controller 21 determines whether or not an instruction of an image display is made based on the image signals and the display is started, and repeats the same process until the display is started. Then, it is determined in step S71 that the display is started, the process proceeds to step S72.

In step S72, the power management unit 81 reads out image signals of one frame to be displayed next among the displayed image signals.

In step S73, the power management unit 81 reads out the peak light emission amount which becomes the maximum light emission amount among the read-out image signals of one frame to be displayed next.

In step S74, the power management unit 81 reads out the calibration result representing the relation between the voltage Vc stored by the most recent calibration process and the light emission amount to the calibration unit 82 and reads out the voltage Vc associated with the peak light emission amount.

In step S75, the power management unit 81 controls the power source 29 such that the voltage Vc measured by the Vc monitor unit 83 becomes the voltage Vc associated with the read-out peak light emission amount, and supplies the power to the anode side of the laser diode LD while adjusting the output voltage Vo.

In step S76, the power management unit 81 determines whether or not the image signal is completed depending on whether the image signal of the next frame is present or absent. When the image signal is not completed, the process returns to step S72. That is, until the image signal is completed, the processes in steps S72 to S76 are repeated.

Then, it is determined in step S76 that when the image signal of the next frame does not exist and the image signal is completed, the process is completed.

By the above-mentioned processes, the calibration process repeatedly executed at the predetermined time interval is performed to adjust the output voltage Vo of the power source 29 to be the voltage Vc on the cathode side of the laser diode LD associated with the peak light emission amount of the next one frame based on the image signals by the calibration result stored in the calibration unit 82 by the most recent process and apply the output voltage Vo on the anode side of the laser diode LD. Therefore, it is possible to supply the power to the laser diode LD at an appropriate output voltage Vo corresponding to the temperature characteristic of the laser diode LD. As a result, power saving of the projection apparatus can be realized.

Figure 15:
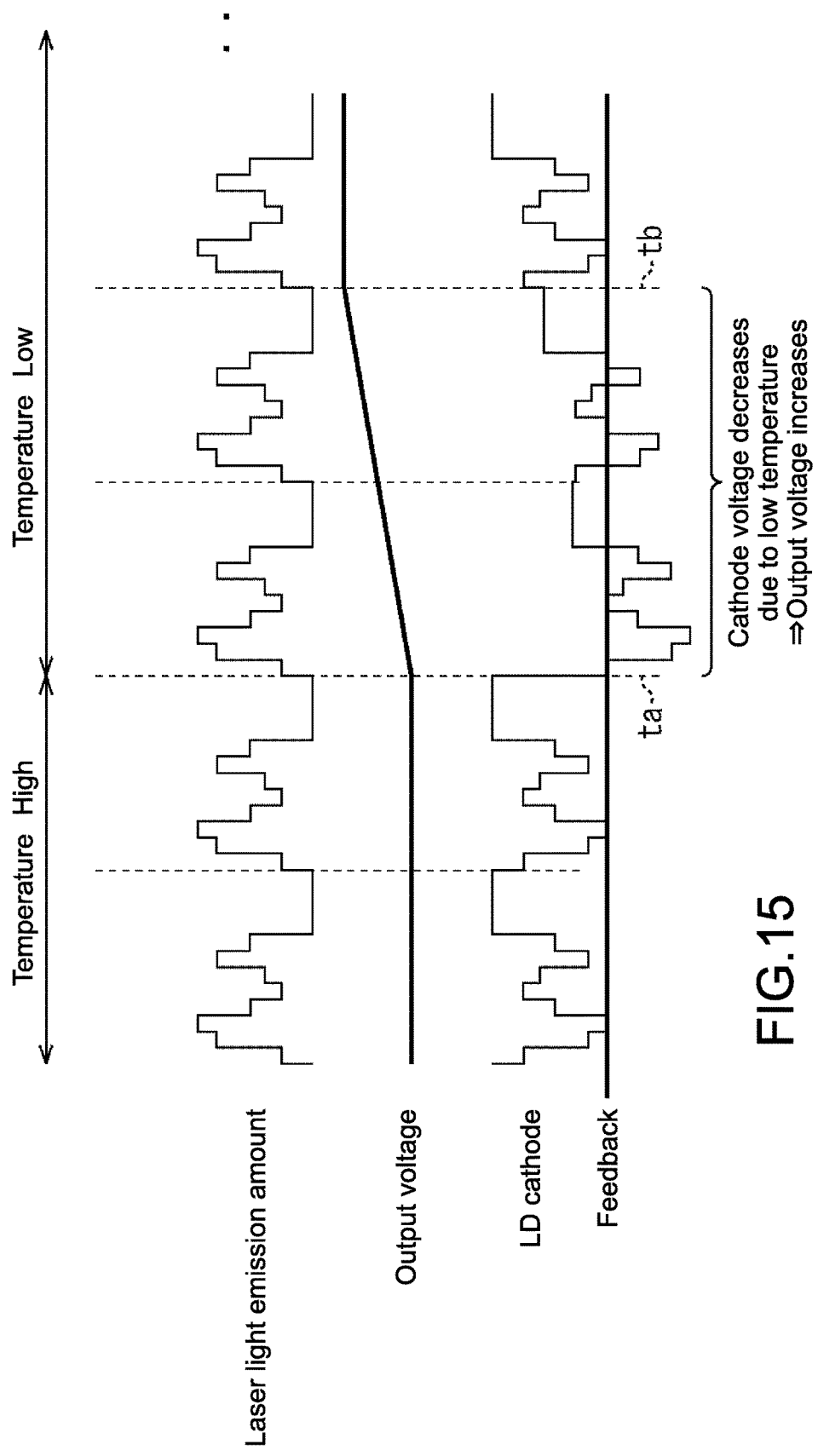
FIG. 15 is a diagram describing the output voltage control process performed by the power control mechanism in FIG. 12.

That is, as shown in FIG. 15, even when the voltage drop of the laser diode LD increases with a decrease in temperature at a time to and the voltage Vc on the cathode side of the laser diode LD decreases, it is possible to adjust and output the output voltage Vo of the power source 29 while feedback control is performed so as to constantly maintain the voltage Vc associated with the light emission amount and raise the output voltage Vo. Accordingly, the laser light emission amount does not depend on the temperature characteristic of the laser diode LD and the power can be supplied to the laser diode LD at the appropriate output voltage Vo. Therefore, power saving can be realized.

It should be noted that in FIG. 15, the vertical axis represents, from the top, the laser light emission amount, the output voltage Vo, and the voltage Vc on the cathode side of the laser diode LD while the horizontal axis represents a time. Moreover, before the time ta, the laser diode LD is represented at high temperature, and after the time ta, the laser diode LD is represented at low temperature. That is, the voltage Vc on the cathode side decreases at the time ta, such that the power source 29 raises the output voltage Vo and supplies the power in the time ta to a time tb as necessary for the peak light emission amount. Therefore, the laser light emission amount of the laser diode LD is maintained constantly.

Moreover, the calibration process in a power management mechanism in FIG. 5 may be executed at the predetermined time interval and the output voltage control process may be realized by using the most recent calibration result.

Further, the power consumption of the laser diode LD which becomes the light source can be reduced, such that an amount of heat generation can be also reduced without the necessity to provide a fan and the like for dissipating heat. Therefore, the configuration of the fan and the like is not necessary and size reduction of the imaging apparatus as well as reduction of power consumption can be realized.

3. Third Embodiment

<Still Another Configuration Example of Power Control Mechanism for Realizing Power Saving of Power Source>

In the above, the example has been described in which the power control mechanism repeatedly executes the calibration process for measuring the light emission amount in association with the voltage Vc on the cathode side of the laser diode LD at the predetermined time interval, and feedback-controls the output voltage Vo by using the most recent calibration result to be the voltage Vc associated with the necessary peak light emission amount. Alternatively, for example, the power control mechanism may realize the power saving while coping with the temperature characteristic by storing the relation between the output voltage Vo and an actual light emission amount of the laser diode LD, estimating an output voltage Vo necessary for the peak light emission amount from the relation between the stored output voltage Vo and the actually measured light emission amount, and making control to be the estimated output voltage Vo.

Figure 16:
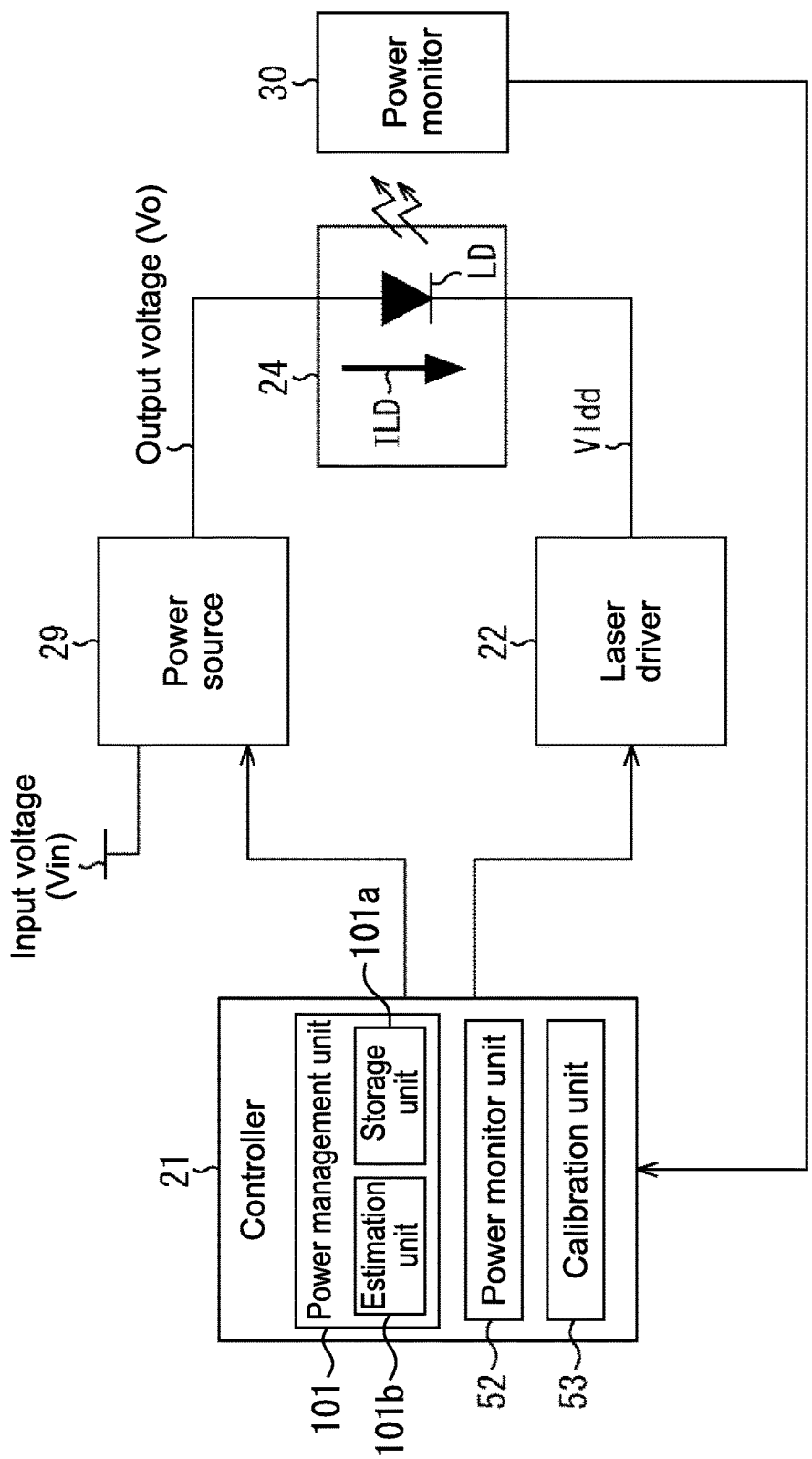
FIG. 16 is a diagram showing a configuration example of a power control mechanism of a projection apparatus according to a third embodiment to which the present technology is applied.

Referring to FIG. 16, a function of the power control mechanism which stores the relation between the output voltage Vo and the actual light emission amount of the laser diode LD, estimates an output voltage Vo necessary for the peak light emission amount from the relation between the stored output voltage Vo and the actually measured light emission amount, and controls the power source 29 to obtain the estimated output voltage Vo will be described. It should be noted that components having the same functions as the components of the power control mechanism in FIG. 5 are represented by the same names and reference numerals, and descriptions thereof are omitted when appropriate.

That is, the power control mechanism in FIG. 16 differs from the power control mechanism in FIG. 5 in a configuration including a power management unit 101 instead of the power management unit 51 of the controller 21. The power management unit 101 includes a storage unit 101a and an estimation unit 101b. Then, the output voltage Vo obtained by controlling the power source 29 and the actual light emission amount of the laser diode LD obtained by the power monitor unit 52 controlling the power monitor 30 at that time are stored in association with each other. Then, the power management unit 101 controls the estimation unit 101b to estimate an appropriate output voltage Vo to the peak light emission amount in the next frame based on the relation between the output voltage Vo and the actual light emission amount of the laser diode LD stored in the storage unit 101a and based on the calibration result stored in the calibration unit 53, and controls the power source 29 to obtain the estimated output voltage Vo.

<Output Voltage Control Process Performed by Power Control Mechanism in FIG. 16>

Figure 17:
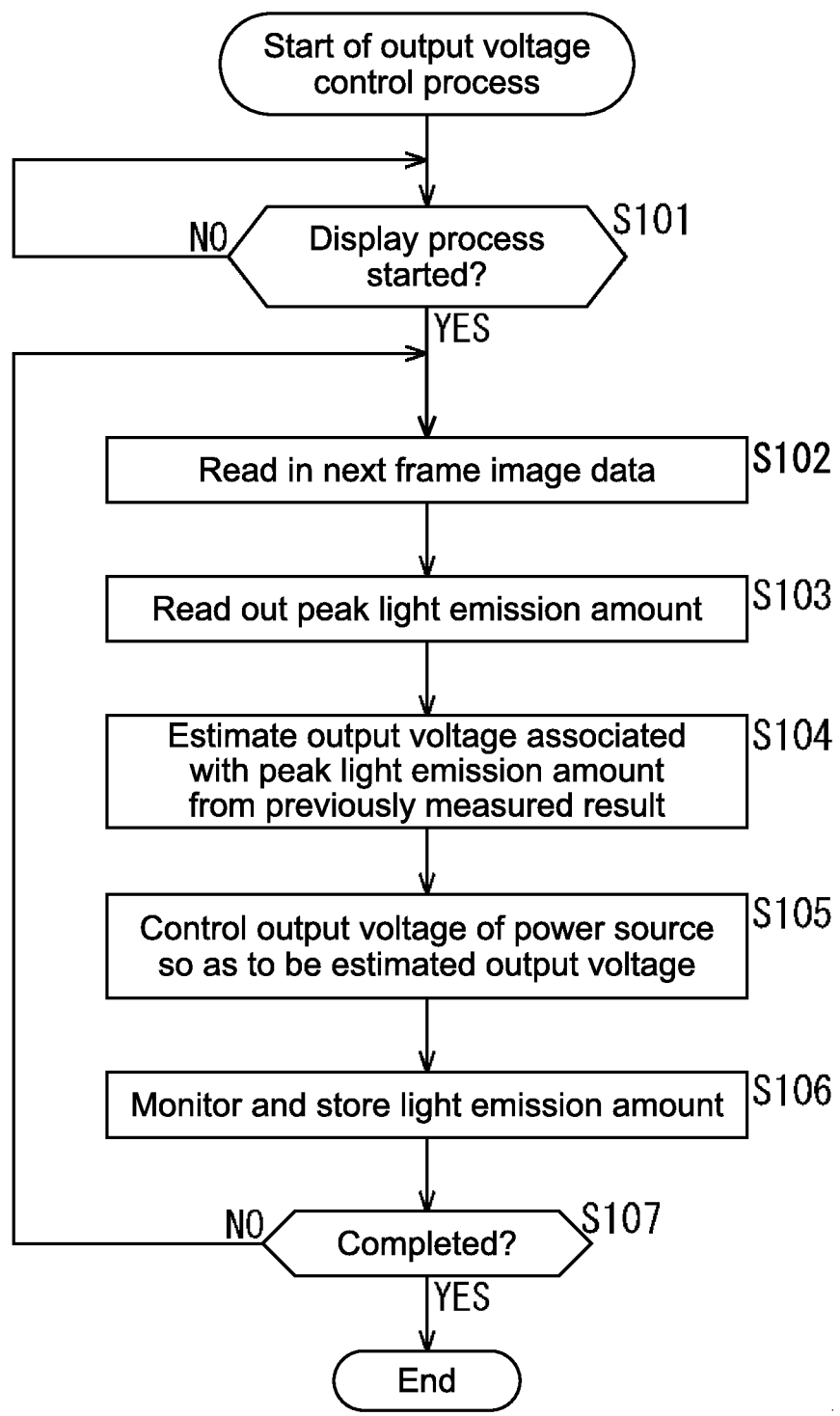
FIG. 17 is a flowchart describing an output voltage control process performed by the power control mechanism in FIG. 16.
Figure 18:
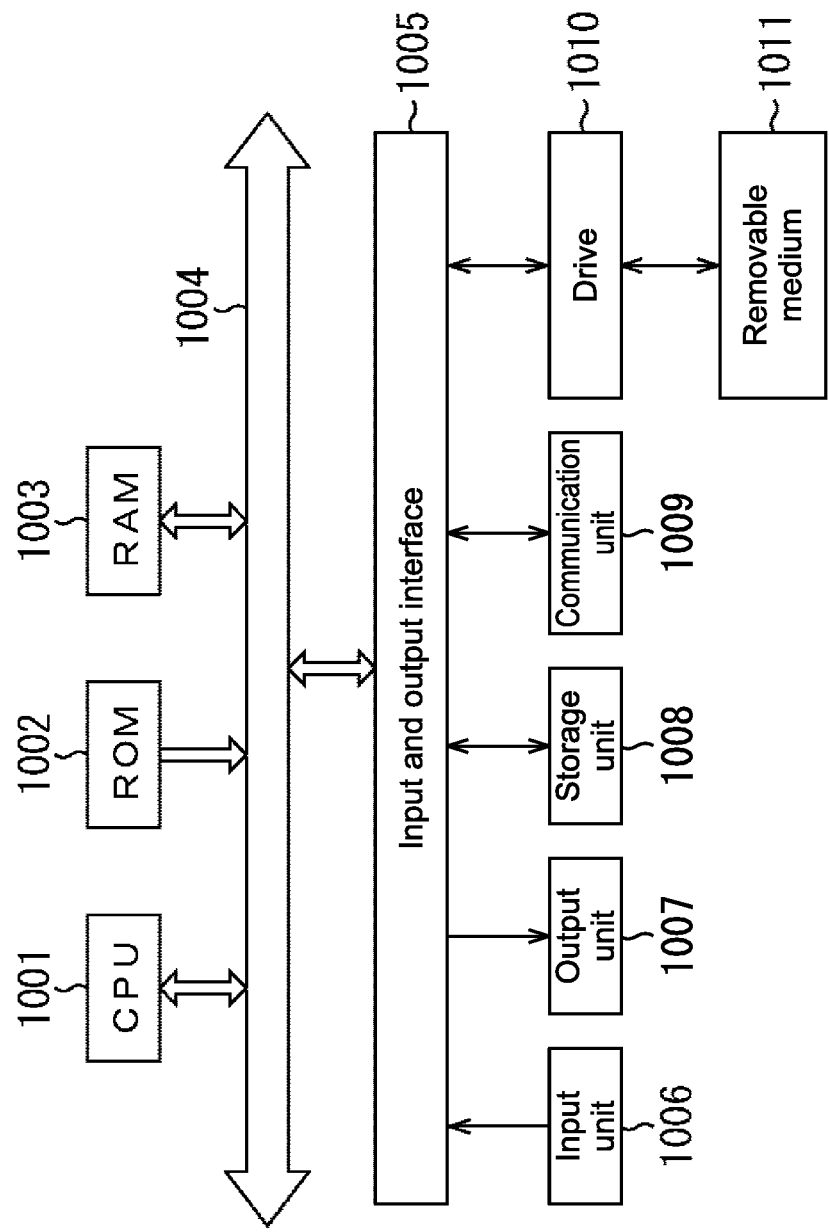
FIG. 18 is a diagram describing a configuration example of a general purpose personal computer.

Next, referring to a flowchart in FIG. 17, the calibration process performed by the power control mechanism in FIG. 16 will be described. It should be noted that processes in steps S101 to S103 and S107 in the flowchart in FIG. 17 are the same as the processes in steps S31 to S33 and S36 in the flowchart in FIG. 8, and thus description thereof will be appropriately omitted.

In the processes in steps S101 to S103, when the power management unit 101 of the controller 21 determines that an image display is started, reads out image signals of one frame to be displayed next among the displayed image signals, and reads out the peak light emission amount which becomes the maximum light emission amount among the read-out image signals of one frame to be displayed next, the process proceeds to step S104.

In step S104, the power management unit 101 controls the estimation unit 101b to estimate the output voltage Vo associated with the peak light emission amount of the image signals of one frame to be displayed next based on the information of the relation between the output voltage Vo and the actual light emission amount of the laser diode LD which is stored in the storage unit 101a and which is stored in association with the previous output voltage Vo and based on the calibration result stored in the calibration unit 53. More particularly, for example, when the number of information stored in the storage unit 101a is not sufficient, the estimation unit 101b uses the calibration result as it is to estimate the output voltage Vo associated with the peak light emission amount of the image signals of one frame to be displayed next. Moreover, when the number of information stored in the storage unit 101a is sufficient, the estimation unit 101b determines, as an estimation result, a number of the most recent average output voltages among the output voltages Vo stored in association with the peak light emission amount of the image signals of one frame to be displayed next among the information stored in the storage unit 101a and the calibration result. Further, when a sufficient time has elapsed from a timing at which the calibration process is performed, the estimation unit 101b may determine, as the estimation result, the several most recent average output voltages among the output voltages Vo stored in association with the peak light emission amount of the image signals of one frame to be displayed next among the information stored in the storage unit 101a and the calibration result.

Further, the estimation unit 101b may determine, as the estimation result, the several most recent average output voltages among the output voltages Vo stored in association with the peak light emission amount of the image signals of one frame to be displayed next from only the information stored in the storage unit 101a.

In any case, by the above-mentioned processes, for example, even when the light emission amount varies in accordance with the output voltage Vo as the temperature of the laser diode LD varies, it is possible to correct it to the output voltage Vo suitable for a current state and set the output voltage Vo.

In step S105, the power management unit 101 controls the power source 29 to supply the power to the anode of the laser diode LD at the output voltage Vo estimated by the estimation unit 101b.

In step S106, the power management unit 101 associates the light emission amount monitored (measured) by the power monitor unit 30 in the power monitor unit 52 with the output voltage Vo which controls the power source 29 in the process in step S105 and stores them in the storage unit 101a.

By the above-mentioned processes, even when the relation between the output voltage Vo and the light emission amount in the laser diode LD varies as the light emission of the laser diode LD continues, the appropriate output voltage Vo with respect to a necessary light emission amount is estimated and outputted based on the most recent state. Therefore, the appropriate output voltage can be applied to the laser diode with respect to the necessary light emission amount while an unnecessary output voltage is suppressed. As a result, it is possible to realize power saving of the projection apparatus.

It should be noted that in the above, the example of the projection apparatus using the laser diode LD has been described. However, the present technology can be applied to other apparatuses as long as output from the power source which supplies power to a light emitting unit of an image output apparatus is controlled.

As described above, according to the present technology, it is possible to realize power saving of the power consumption of the image output apparatus represented by the projection apparatus having the light emitting unit such as the laser diode.

Although the series of processes described above may be executed by hardware, the series of processes may also be executed by software. When the series of processes are executed by the software, the program constituting the software is installed on, for example, a computer having built-in dedicated hardware or a general purpose computer capable of installing various programs and executing various functions from a recording medium.

FIG. 16 shows a configuration example of the general purpose personal computer. This personal computer has a built-in central processing unit (CPU) 1001. An input and output interface 1005 is connected to the CPU 1001 via a bus 1004. A read only memory (ROM) 1002 and a random access memory (RAM) 1003 are connected to the bus 1004.

An input unit 1006 acting as an input device such as a keyboard and a mouse on which a user inputs an operation command, an output unit 1007 outputting a process operation screen or a processed result image to a display device, a storage unit 1008 such as a hard disk drive storing programs or various types of data, and a communication unit 1009 such as a local area network (LAN) adapter carrying out a communication process via a network represented as the Internet are connected to the input and output interface 1005. In addition, a magnetic disk (including a flexible disk), an optical disk (including compact disc-read only memory (CD-ROM) and a digital versatile disk (DVD)), a magneto-optical disk (including a mini disk (MD)), or a drive 1010 reading and writing data with respect to a removable medium 1011 such as a semiconductor memory, are connected thereto.

The CPU 1001 executes various processes in accordance with the program stored in the ROM 1002, or the program that is read out from the magnetic disk, the optical disk, the magneto-optical disk, or the removable medium 1011 such as a semiconductor memory, installed in the storage unit 1008, and loaded onto the RAM 1003 from the storage unit 1008. Necessary data or the like used to execute various processes in the CPU 1001 are also appropriately stored in the RAM 1003.

In a computer having the above-described configuration, the CPU 1001 loads, for example, a program stored in the storage unit 1008 to the RAM 1003 via the input and output interface 1005 and the bus 1004 and executes the loaded program to carry out the series of processes described above.

The program executed by the computer (CPU 1001) is, for example, provided as a program stored on the removable medium 1011, which is a package medium. Moreover, the program may be provided via a wired or wireless transmitting medium such as a local area network, the Internet, or digital satellite broadcasting.

In the computer, the programs can be installed in the storage unit 1008 via the input and output interface 1005 by inserting the removable medium 1011 to the drive 1010. Moreover, the program may be installed in the storage unit 1008 after being received by the communication unit 1009 via the wired or wireless transmitting medium. Alternatively, the program may be installed in advance in the ROM 1002 and/or the storage unit 1008.

It should be noted that the program executed by the computer may be carried out in a time-sequential order following the order described in this specification, may be carried out in parallel, or may be carried out at an appropriate timing when the program is called, for example.

Moreover, in this specification, a system is a collection of a plurality of components (apparatuses, modules or parts, etc.) and all components are not necessarily disposed in a single casing. Thus, a system may include a plurality of apparatuses disposed in individual casings and connected via a network and may be an apparatus including a plurality of modules disposed in a single casing.

It should be noted that embodiments of the present technology are not limited to the above-described embodiments but may have various modifications without departing from the scope of the present technology.

For example, the present technology may employ cloud computing where a single function is distributed to a plurality of apparatuses via a network and is processed in cooperation.

In addition, each step described in the above-mentioned flowcharts may be not only executed by a single device, but may be also distributed to a plurality of apparatuses and be executed therein.

Further, in a case where a single step includes a plurality of processes, the plurality of processes included in the step may be not only executed by a single apparatus, but may be also distributed to a plurality of apparatuses and be executed therein.

It should be noted that the present technology may also be configured as follows.

(1) An image output apparatus, including:
a light emitting unit configured to emit a laser beam;
a power supplying unit configured to supply power to the light emitting unit at a predetermined voltage; and
a control unit configured to control the power supplying unit to supply the power to the light emitting unit in a predetermined period at the voltage associated with a peak light emission amount of the light emitting unit in image data for the predetermined period.

(2) The image output apparatus according to Item (1), further including:
a light emission amount measuring unit configured to measure the light emission amount emitted by the light emitting unit; and
an adjustment storage unit configured to store the light emission amount measured by the light emission amount measuring unit in association with each voltage of the power supplied to the light emitting unit when the control unit controls the power supplying unit to supply the power to the light emitting unit while varying the voltage of the power supplied to the light emitting unit, in which
the control unit is configured to control the power supplying unit to read in the image data for the predetermined period and supply the power to the light emitting unit in the predetermined period at the voltage associated with the peak light emission amount of the read-in image data for the predetermined period among the light emission amounts stored in the adjustment storage unit.

(3) The image output apparatus according to Item (2), in which
the adjustment storage unit is configured to store the light emission amount measured by the light emission amount measuring unit in association with each voltage of the power supplied to the light emitting unit when the control unit controls the power supplying unit to supply the power to the light emitting unit while varying the voltage of the power supplied to the light emitting unit at a predetermined voltage interval from a lowest voltage up to a highest voltage at a startup time.

(4) The image output apparatus according to Item (2), in which
the adjustment storage unit is configured to repeatedly store the light emission amount measured by the light emission amount measuring unit in association with each voltage of the power supplied to the light emitting unit when the control unit repeatedly controls the power supplying unit to supply the power to the light emitting unit while varying the voltage of the power supplied to the light emitting unit at the predetermined voltage interval from a lowest voltage up to a highest voltage at a predetermined time interval, and
the control unit is configured to control the power supplying unit to read in the image data for the predetermined period and supply the power to the light emitting unit in the predetermined period at the voltage most recently stored associated with the peak light emission amount of the read-in image data for the predetermined period among the light emission amounts stored in the adjustment storage unit.

(5) The image output apparatus according to Item (1), further including:

a light emission amount measuring unit configured to measure the light emission amount emitted by the light emitting unit;

an output voltage measuring unit configured to measure an output voltage of the light emitting unit; and an adjustment storage unit configured to store the light emission amount measured by the light emission amount measuring unit in association with each output voltage of output power measured by the output voltage measuring unit when the control unit controls the power supplying unit to supply the power to the light emitting unit while varying the voltage of the power supplied to the light emitting unit such that the output voltage measured by the output voltage measuring unit varies, in which the control unit is configured to control the power supplying unit to read in the image data for the predetermined period and supply the power to the light emitting unit in the predetermined period at the output voltage associated with the peak light emission amount of the read-in image data for the predetermined period among the light emission amounts stored in the adjustment storage unit.

(6) The image output apparatus according to Item (5), in which the adjustment storage unit is configured to repeatedly store the light emission amount measured by the light emission amount measuring unit in association with each output voltage when the control unit repeatedly controls the power supplying unit to supply the power to the light emitting unit while varying the voltage of the power supplied to the light emitting unit at a predetermined voltage interval such that the output voltage measured by the output voltage measuring unit varies from a lowest voltage up to a highest voltage at the predetermined time interval, and the control unit is configured to control the power supplying unit to read in the image data for the predetermined period and supply the power to the light emitting unit in the predetermined period at the output voltage most recently stored associated with the peak light emission amount of the read-in image data for the predetermined period among the light emission amounts stored in the adjustment storage unit.

(7) The image output apparatus according to Item (1), further including a light emission amount measuring unit configured to measure the light emission amount emitted by the light emitting unit, in which the control unit includes a measured result storage unit configured to store, as a measured result, a power supply voltage supplied to the light emitting unit by the power supplying unit and the light emission amount measured by the light emission amount measuring unit in association with each other, and an estimation unit configured to estimate the voltage associated with the peak light emission amount of the light emitting unit in the image data for the predetermined period based on the measured result stored in the measured result storage unit, and the control unit is configured to control the power supplying unit to read in the image data for the predetermined period and supply the power to the light emitting unit in the predetermined period at the voltage estimated by the estimation unit as the voltage associated with the peak light emission amount of the read-in image data for the predetermined period.

(8) The image output apparatus according to Item (7), further including an adjustment storage unit configured to store the light emission amount measured by the light emission amount measuring unit in association with each voltage of the power supplied to the light emitting unit when the control unit controls the power supplying unit to supply the power to the light emitting unit while varying the voltage of the power supplied to the light emitting unit at a predetermined voltage interval from a lowest voltage up to a highest voltage at a startup time, in which the estimation unit is configured to estimate the voltage associated with the peak light emission amount of the light emitting unit in the image data for the predetermined period based on information stored in the adjustment storage unit and the measured result stored in the measured result storage unit, and the control unit is configured to control the power supplying unit to read in the image data for the predetermined period and supply the power to the light emitting unit in the predetermined period at the voltage estimated by the estimation unit as the voltage associated with the peak light emission amount of the read-in image data for the predetermined period.

(9) The image output apparatus according to Item (1), further including a current value setting unit configured to set a current value supplied to the light emitting unit in association with intensity emitted by the light emitting unit based on the image data.

(10) The image output apparatus according to Item (1), in which the light emitting unit is a laser diode.

(11) An operation method for an image output apparatus, including:

performing a light emitting process of emitting a laser beam;

performing a power supplying process of supplying power at a predetermined voltage for performing the light emitting process; and performing a control process of controlling the power supplying process to supply the power for performing the light emitting process in the predetermined period at the voltage associated with a peak light emission amount by the light emitting process in image data for the predetermined period.

(12) A program that causes a computer to execute a process including:

a light emitting step of emitting a laser beam;

a power supplying step of supplying power at a predetermined voltage for performing a process of the light emitting step; and a control step of controlling the process of the supplying power step to supply the power for performing the process of the light emitting step in a predetermined period at the voltage associated with a peak light emission amount by the process of the light emitting step in image data for the predetermined period.

(13) An electronic circuit configured to at least connect a light emitting unit configured to emit a laser beam and a power supplying unit configured to supply power to the light emitting unit at a predetermined voltage, the electronic circuit including a control unit configured to control the power supplying unit to supply the power to the light emitting unit in a predetermined period at the voltage associated with a peak light emission amount of the light emitting unit in image data for the predetermined period.

(14) The electronic circuit according to Item (13), being further configured to connect a light emission amount measuring unit configured to measure the light emission amount emitted by the light emitting unit, and further including an adjustment storage unit configured to store the light emission amount measured by the light emission amount measuring unit in association with each voltage of the power supplied to the light emitting unit when the control unit controls the power supplying unit to supply the power to the light emitting unit while varying the voltage of the power supplied to the light emitting unit, in which the control unit is configured to control the power supplying unit to read in the image data for the predetermined period and supply the power to the light emitting unit in the predetermined period at the voltage associated with the peak light emission amount of the read-in image data for the predetermined period among the light emission amounts stored in the adjustment storage unit.

(15) The electronic circuit according to Item (13), being further configured to connect a light emission amount measuring unit configured to measure the light emission amount emitted by the light emitting unit, and an output voltage measuring unit configured to measure an output voltage of the light emitting unit, and further including an adjustment storage unit configured to store the light emission amount measured by the light emission amount measuring unit in association with each output voltage of output power measured by the output voltage measuring unit when the control unit controls the power supplying unit to supply the power to the light emitting unit while varying the voltage of the power supplied to the light emitting unit such that the output voltage measured by the output voltage measuring unit varies, in which the control unit is configured to control the power supplying unit to read in the image data for the predetermined period and supply the power to the light emitting unit in the predetermined period at the output voltage associated with the peak light emission amount of the read-in image data for the predetermined period among the light emission amounts stored in the adjustment storage unit.

(16) The electronic circuit according to Item (13), being further configured to connect a light emission amount measuring unit configured to measure the light emission amount emitted by the light emitting unit, in which the control unit including a measured result storage unit configured to store, as a measured result, a power supply voltage supplied to the light emitting unit by the power supplying unit and the light emission amount measured by the light emission amount measuring unit in association with each other, and an estimation unit configured to estimate the voltage associated with the peak light emission amount of the light emitting unit in the image data for the predetermined period based on the measured result stored in the measured result storage unit, and the control unit is configured to control the power supplying unit to read in the image data for the predetermined period and supply the power to the light emitting unit in the predetermined period at the voltage estimated by the estimation unit as the voltage associated with the peak light emission amount of the read-in image data for the predetermined period.

(17) An electronic apparatus, including:

a light emitting unit configured to emit a laser beam;

a power supplying unit configured to supply power to the light emitting unit at a predetermined voltage; and a control unit configured to control the power supplying unit to supply the power to the light emitting unit in a predetermined period at the voltage associated with a peak light emission amount of the light emitting unit in image data for the predetermined period.

It should be understood by those skilled in the art that various modifications, combinations, sub-combinations and alterations may occur depending on design requirements and other factors insofar as they are within the scope of the appended claims or the equivalents thereof.

What is claimed is:

1. An image output apparatus comprising:
    a laser diode configured to emit a beam of light, an intensity of the beam is an emission amount of the beam;
    a laser driver that uses an image signal to generate a drive signal before outputting the drive signal to a cathode of the laser diode, the laser diode is configured to use the drive signal to adjust the emission amount of the beam;
    a power source that sets an output voltage to a voltage level before outputting the output voltage to an anode of the laser diode, the laser diode is configured to use the output voltage to adjust the emission amount of the beam;
    a power monitor configured to electronically convert at least a portion of the beam into a measured light emission amount; and
    a controller that uses the measured light emission amount to create output voltage information, the power source is controllable by the output voltage information to set the output voltage at the voltage level.

2. The image output apparatus according to claim 1, further comprising:
    a mirror that reflects at least another portion of the beam onto a screen.

3. The image output apparatus according to claim 1, wherein the power source is controllable to set the voltage level to a lowest drive voltage.

4. The image output apparatus according to claim 3, wherein the light is emissible from the laser diode when the voltage level is at least the lowest drive voltage and is non-emissible from the laser diode when the voltage level is less than the lowest drive voltage.

5. The image output apparatus according to claim 3, wherein when the voltage level is higher than the lowest drive voltage, the output voltage information associates the voltage level higher than the lowest drive voltage with the amount of the emission.

6. The image output apparatus according to claim 1, wherein the intensity of the beam is greatest when the beam is at a peak light emission amount.

7. The image output apparatus according to claim 6, wherein the voltage level is a voltage required for the laser diode to emit the beam at the peak light emission amount.

8. The image output apparatus according to claim 6, wherein the laser diode is configured to emit the beam of light at various light emission amounts.

9. The image output apparatus according to claim 8, wherein none of the light emission amounts is greater than the peak light emission amount.

10. The image output apparatus according to claim 8, wherein the peak light emission amount is a highest one of the light emission amounts.

11. An operation method for an image output apparatus comprising:
- emitting a beam of light from a laser diode, an intensity of the beam is an emission amount of the beam;
- using an image signal to generate a drive signal before outputting the drive signal to a cathode of the laser diode, the laser uses the drive signal to adjust the emission amount of the beam;
- setting an output voltage to a voltage level before outputting the output voltage to an anode of the laser diode, the laser diode uses the output voltage to adjust the emission amount of the beam;
- electronically, by a power monitor, converting at least a portion of the beam into a measured light emission amount;
- using the measured light emission amount to create output voltage information; and
- controlling a power source with the output voltage information to set the output voltage at the voltage level.

12. The operation method according to claim 11, further comprising:
- reflecting at least another portion of the beam onto a screen.

13. The operation method according to claim 11, further comprising:
- controlling the power source to set the voltage level to a lowest drive voltage.

14. The operation method according to claim 13, further comprising:
- emitting the light from the laser diode when the voltage level is at least the lowest drive voltage, the light is non-emissible from the laser diode when the voltage level is less than the lowest drive voltage.

15. The operation method according to claim 13, wherein when the voltage level is higher than the lowest drive voltage, the output voltage information associates the voltage level higher than the lowest drive voltage with the amount of the emission.

16. The operation method according to claim 11, wherein the intensity of the beam is greatest when the beam is at a peak light emission amount.

17. The operation method according to claim 16, wherein the voltage level is a voltage required for the laser diode to emit the beam at the peak light emission amount.

18. The operation method according to claim 16, wherein the laser diode is configured to emit the beam of light at various light emission amounts.

19. The operation method according to claim 18, wherein none of the light emission amounts is greater than the peak light emission amount.

20. The operation method according to claim 18, wherein the peak light emission amount is a highest one of the light emission amounts.

* * * * *